(12) United States Patent
Clarke

(10) Patent No.: US 7,685,302 B2
(45) Date of Patent: Mar. 23, 2010

(54) COMMUNICATIONS SYSTEM PROVIDING EXTENSIBLE PROTOCOL TRANSLATION AND CONFIGURATION FEATURES AND RELATED METHODS

(75) Inventor: David James Clarke, Redmond, WA (US)

(73) Assignee: Teamon Systems, Inc., Issaquah, WA (US)

( * ) Notice: Subject to any disclaimer, the term of this patent is extended or adjusted under 35 U.S.C. 154(b) by 995 days.

(21) Appl. No.: 10/777,936

(22) Filed: Feb. 12, 2004

(65) Prior Publication Data

US 2005/0038897 A1    Feb. 17, 2005

Related U.S. Application Data

(60) Provisional application No. 60/494,234, filed on Aug. 11, 2003.

(51) Int. Cl.
  *G06F 15/16* (2006.01)
(52) U.S. Cl. .................................. 709/230; 709/227
(58) Field of Classification Search ....................... None
  See application file for complete search history.

(56) References Cited

U.S. PATENT DOCUMENTS

| | | | | |
|---|---|---|---|---|
| 5,802,292 | A | 9/1998 | Mogul | 395/200.33 |
| 5,995,503 | A | 11/1999 | Crawley et al. | 370/351 |
| 6,070,191 | A | 5/2000 | Narendran et al. | 709/226 |
| 6,230,193 | B1 | 5/2001 | Arunkumar et al. | 709/218 |
| 6,289,212 | B1 | 9/2001 | Stein et al. | 455/412 |
| 6,311,165 | B1 | 10/2001 | Coutts et al. | 705/21 |
| 6,356,529 | B1 | 3/2002 | Zarom | 370/231 |
| 6,421,732 | B1 | 7/2002 | Alkhatib et al. | 709/245 |
| 6,425,057 | B1 | 7/2002 | Cherkasova et al. | 711/134 |
| 6,446,114 | B1 | 9/2002 | Bulfer et al. | 709/206 |
| 6,463,427 | B1 | 10/2002 | Wu | 707/3 |
| 6,549,937 | B1 | 4/2003 | Auerbach et al. | 709/206 |
| 6,557,026 | B1 | 4/2003 | Stephens, Jr. | 709/203 |
| 6,560,222 | B1 | 5/2003 | Pounds et al. | 370/353 |
| 6,578,069 | B1 | 6/2003 | Hopmann et al. | 709/203 |
| 6,597,683 | B1 | 7/2003 | Gehring et al. | 370/348 |
| 6,615,212 | B1 | 9/2003 | Dutta et al. | 707/10 |

(Continued)

FOREIGN PATENT DOCUMENTS

WO    03/005220    1/2003

(Continued)

*Primary Examiner*—Vivek Srivastava
*Assistant Examiner*—Ryan J Jakovac
(74) *Attorney, Agent, or Firm*—Allen, Dyer, Doppelt, Milbrath & Gilchrist, P.A.

(57) ABSTRACT

A communications system may include data storage devices and mobile wireless communications devices for accessing the data storage devices, each using one or more different operating protocols. The system may further include a protocol interface device, which may include a protocol engine module for communicating with the data storage devices using respective operating protocols, and a front-end proxy module coupled to the protocol engine module. The front-end proxy module may include a respective proxy module for communicating with the mobile wireless communications devices using each different operating protocol, and at least one common core service module coupled to the proxy modules. The protocol interface device may also include a configuration file module coupled to the front-end proxy module for storing a plurality of different sets of configuration files relating to different allocations of resources of the at least one common core service module.

20 Claims, 13 Drawing Sheets

U.S. PATENT DOCUMENTS

| | | |
|---|---|---|
| 6,785,255 B2 | 8/2004 | Sastri et al. ................. 370/338 |
| 2001/0042100 A1 | 11/2001 | Guedalia et al. ............ 709/206 |
| 2001/0043577 A1 | 11/2001 | Barany et al. ................ 370/328 |
| 2001/0056504 A1 | 12/2001 | Kuznetsov .................. 709/310 |
| 2002/0019812 A1 | 2/2002 | Board et al. .................. 705/51 |
| 2002/0035605 A1 | 3/2002 | McDowell et al. .......... 709/206 |
| 2002/0087628 A1 | 7/2002 | Rouse et al. ................ 709/203 |
| 2002/0112007 A1 | 8/2002 | Wood et al. ................. 709/206 |
| 2002/0174194 A1 | 11/2002 | Mooney et al. ............. 709/219 |
| 2002/0183080 A1* | 12/2002 | Poor et al. ................... 455/466 |
| 2002/0187777 A1 | 12/2002 | Osterhout et al. ........... 455/417 |
| 2003/0004955 A1 | 1/2003 | Cedola et al. ................ 707/100 |
| 2003/0046366 A1 | 3/2003 | Pardikar et al. ............. 709/219 |
| 2003/0093565 A1 | 5/2003 | Berger et al. ................. 709/246 |
| 2003/0097410 A1 | 5/2003 | Atkins et al. ................ 709/206 |
| 2003/0145132 A1 | 7/2003 | Srinivasan .................. 709/328 |
| 2003/0145306 A1 | 7/2003 | Melahn et al. .............. 717/101 |
| 2003/0191799 A1 | 10/2003 | Araujo et al. ............... 709/203 |
| 2004/0044961 A1* | 3/2004 | Pesenson .................... 715/513 |
| 2004/0049737 A1* | 3/2004 | Simon Hunt et al. ........ 715/513 |
| 2004/0162918 A1 | 8/2004 | Freidman et al. ............ 709/246 |
| 2005/0066037 A1* | 3/2005 | Song et al. ................... 709/227 |

FOREIGN PATENT DOCUMENTS

| | | |
|---|---|---|
| WO | 03/041360 | 5/2003 |

* cited by examiner

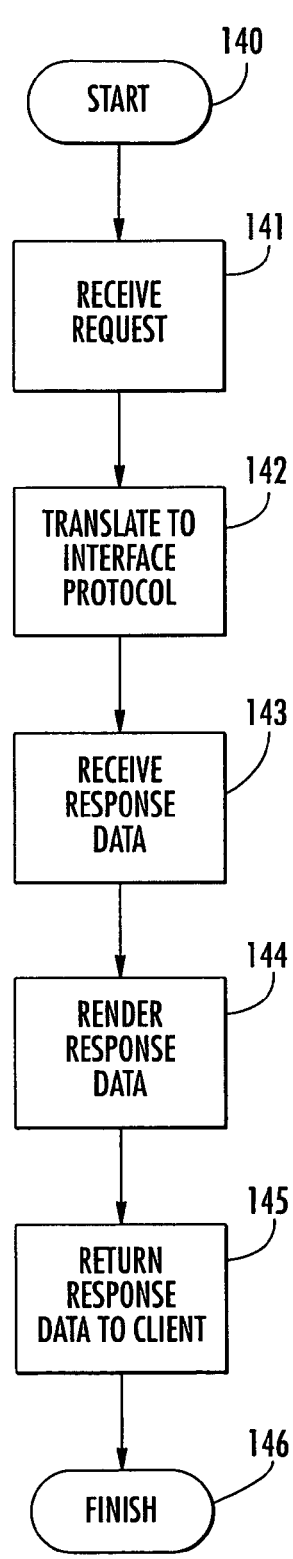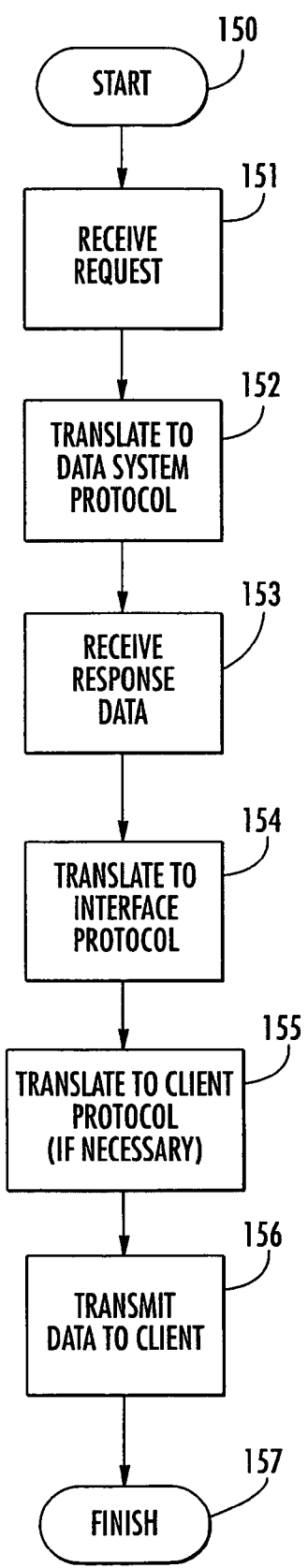
FIG. 14
FIG. 15

COMMUNICATIONS SYSTEM PROVIDING EXTENSIBLE PROTOCOL TRANSLATION AND CONFIGURATION FEATURES AND RELATED METHODS

CROSS-REFERENCE TO RELATED APPLICATIONS

This application claims the benefit of U.S. Provisional Application No. 60/494,234 filed Aug. 11, 2003, which is hereby incorporated herein in its entirety by reference.

FIELD OF THE INVENTION

The present invention relates to the field of communications systems, and, more particularly, to communications systems using multiple operating protocols for data access operations and related methods.

BACKGROUND OF THE INVENTION

Software clients operating on or in conjunction with a computer system are often used to access data stored at a server with which the computer system can establish communications, such as through a local area network (LAN). In many instances, the data on the server is accessible only through a particular protocol, which in turn tends to limit a user to a particular client. Similarly, a particular type of client is typically configurable to operate with only certain types of servers or protocols. In an e-mail system, for example, in which users have associated mailboxes on a mail server, a particular protocol and often a particular messaging client is required for e-mail access. There is no single standard method for accessing e-mail stored on a server. Instead, there are several incompatible protocols defined by various vendors and standards bodies.

Each category of client accessing an application may have different capabilities and needs. For example, a POP client accessing a mail service may require a list of unique identifiers (UIDs) from the server, whereas a WAP client may require not only the UIDs, but also a subject. A desktop browser client may require not only UID and subject, but also information regarding message origination, date, importance, etc. When developing a service that can handle all of these needs, it would a more efficient use of bandwidth and processing power, both on the server and on a target data system such as a mail store, if only the necessary attributes were requested and returned whenever possible.

Another problem is that each of these clients may require slightly different behavior in response to a request. For example, a POP client might request that a message on the server be deleted, however, instead of removing it at the time of the request, the service has to wait until the POP client issues the QUIT command. For a WAP client, on the other hand, the message should be deleted immediately in response to a delete request.

A further problem that frequently occurs when building an application has to do with memory consumption and application performance. To improve performance, it often makes sense to cache results from a data store to more quickly respond to a follow-on request from the client. If data is stored in memory, the application can quickly use up all available memory. Even caching the data on disk can lead to disk space problems.

It is also possible to access multiple data sources that have different capabilities or support different mechanisms for querying information. In this case, code can quickly become convoluted when attempting to manage multiple and different request types.

Various prior art approaches have been developed for providing communications between systems and devices using different operating protocols. One such approach is set forth in U.S. Pat. No. 6,615,212 to Dutta et al., in which a transcoding proxy server receives a request for content from a client machine. The transcoding proxy server retrieves the content from an originating server. The retrieved content is provided in a first format type. In response to a determination that an increase in efficiency would be obtained by allowing the client to process the content in the first format type prior to transcoding the content into a second format type, the transcoding proxy server sends the content to the client in the first format type.

Furthermore, in response to a determination that the client does not have content processing software for processing the content in the first format, the transcoding proxy server sends content processing software for the first format type along with the content in the first format type to the client. The transcoding proxy server then transcodes the content from the first format type into the second format type and sends the content in the second format to the client.

Despite such prior art approaches, further protocol translation and/or conversion functionality may be desirable in certain applications.

SUMMARY OF THE INVENTION

In view of the foregoing background, it is therefore an object of the present invention to provide a communications system providing enhanced operating protocol conversion features and related methods.

This and other objects, features, and advantages in accordance with the present invention are provided by a communications system which may include a plurality of data storage devices each using at least one of a plurality of different operating protocols, and a plurality of mobile wireless communications devices for accessing the plurality of data storage devices. Each mobile wireless communications device may also use at least one of the plurality of different operating protocols. The system may further include a protocol interface device. In particular, the protocol interface device may include a protocol engine module for communicating with the plurality of data storage devices using respective operating protocols, and a front-end proxy module coupled to the protocol engine. The protocol interface device may further include a respective proxy module for communicating with the plurality of mobile wireless communications devices using each different operating protocol, and at least one common core service module coupled to the proxy modules.

Additionally, the front-end proxy module may also include a configuration file module coupled to the front-end proxy module for storing a plurality of different sets of configuration files relating to different allocations of resources of the at least one common core service module. The plurality of different sets of configuration files may include a primary set of configuration files corresponding to core resource allocation operations, and a secondary set of configuration files for customizing the core resource allocation operations. Thus, for example, if a secondary file is specified, resources defined in the secondary file may override those specified in the corresponding primary configuration file(s). This allows a user to specify a core set of resources yet still modify these core resources as desired for a particular application.

More particularly, the at least one common core service module may be for routing traffic between the proxy modules and the protocol engine module, for accessing data from the plurality of data storage devices, and/or rendering data for the plurality of mobile wireless communications devices. In other words, the front-end proxy module advantageously may be used with numerous types of operating protocols, yet still use common core services to route traffic, access data, and/or render data. This provides greater efficiencies, as well as reduced complexity.

The at least one common core service module may include a plurality of handlers for interfacing the proxy modules with the protocol engine module. More specifically, the plurality of proxy modules may convert access requests from the plurality of mobile wireless communications devices to common access parameters. In addition, the front-end proxy module may also include a flow controller module for receiving the common access parameters from the plurality of proxy modules and selecting desired handlers for processing thereof. Moreover, the plurality of handlers and the protocol engine module may communicate using a common interface protocol.

Furthermore, the at least one common core service module may include a renderer module for cooperating with the proxy modules to format data for the plurality of mobile wireless communications devices. Additionally, the at least one common core service module may also include an extensible mark-up language (XML) engine module coupled to the renderer module, such as an extensible stylesheet language transformations (XSLT) engine module, for example. Also, the at least one common core service module may further include a memory coupled to the XML engine module for storing a plurality of templates corresponding to respective operating protocols.

A method aspect of the invention is for interfacing a plurality of mobile wireless communications devices with a plurality of data storage devices. The mobile wireless communications devices and the data storage devices may each use at least one of a plurality of different operating protocols. The method may include providing a protocol engine module for communicating with the plurality of data storage devices using respective operating protocols, and coupling a front-end proxy module to the protocol engine module. More particularly, the front-end proxy module may include a respective proxy module for communicating with the plurality of mobile wireless communications devices using each different operating protocol, and at least one common core service module coupled to the proxy modules. The method may further include providing a configuration file module for the front-end proxy module for storing a plurality of different sets of configuration files relating to different allocations of resources of the at least one common core service module.

A protocol interface device in accordance with the invention may include a front-end proxy module and a protocol engine module, and a configuration file module, such as those described briefly above, for example. Moreover, a computer-readable medium in accordance with the present invention may similarly include a front-end proxy module, a protocol engine module, and a configuration file module.

BRIEF DESCRIPTION OF THE DRAWINGS

FIG. 14 is a flow diagram illustrating operation of the protocol interface module of FIG. 6.

FIG. 15 is a flow diagram illustrating operation of the protocol engine and interface connector modules of FIG. 7.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation are used to indicate similar elements in alternate embodiments.

Figure 1:
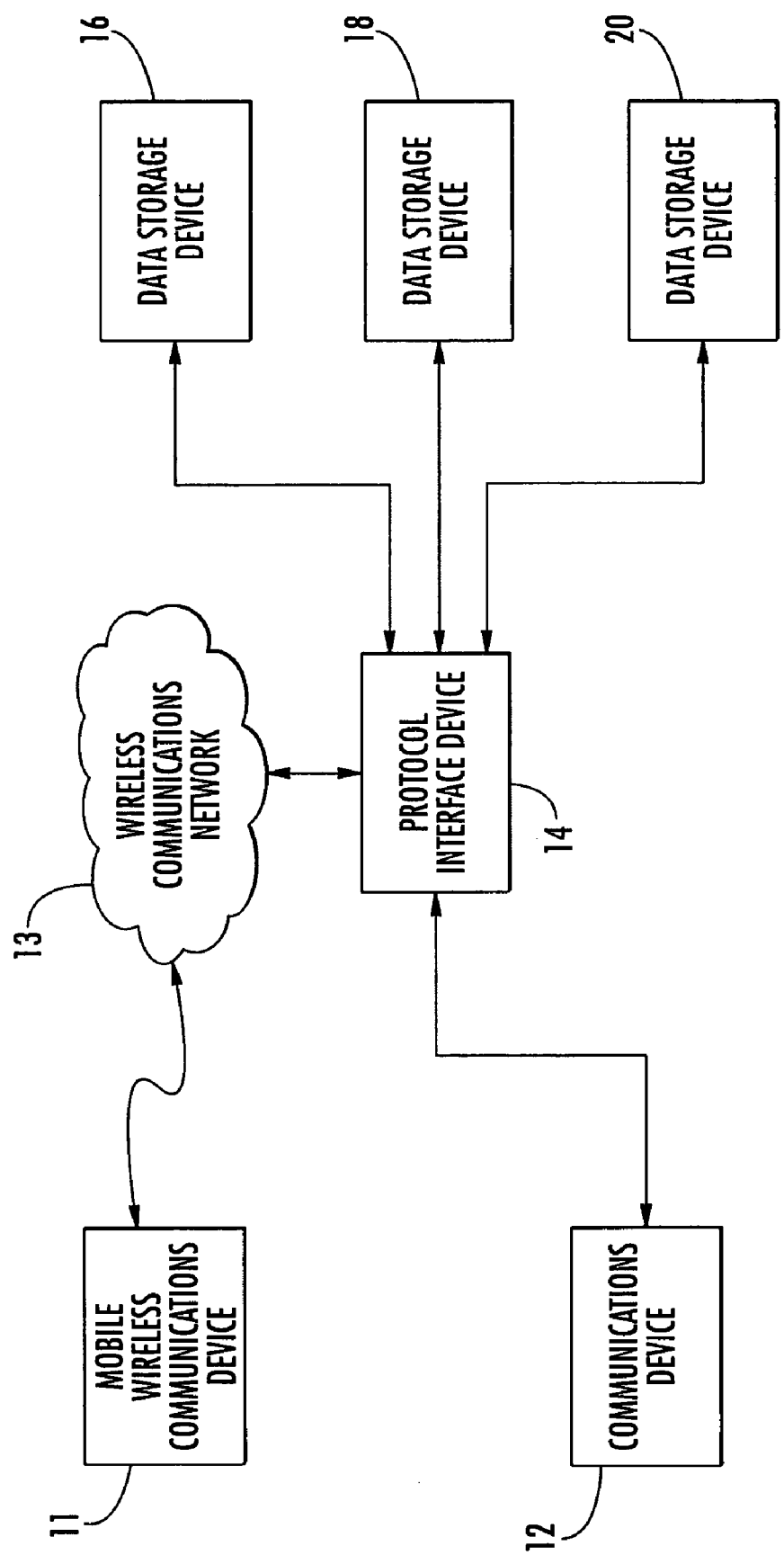
FIG. 1 is a schematic block diagram of a communications system in accordance with the present invention.

Turning now to FIG. 1, a communications system 10 includes a protocol interface device 14 that provides access to a plurality of data storage devices or systems 16, 18, 20. The communications system 10 illustratively includes a plurality of communications devices, namely a mobile wireless communications device 11 and a communications device 12 connected to the system via a wired connection. By way of example, various mobile wireless communications devices may be used in accordance with the invention, such as personal data assistants (PDAs), cellular telephones, etc. An exemplary mobile wireless communications device 11 suitable for use with the present invention is described in the example provided below with reference to FIG. 18. Moreover, examples of wired communications devices include personal computers, telephones, fax machines, etc. Of course, numerous wired and wireless devices may be used, although only two are shown in the exemplary embodiment for clarity of illustration.

The communications devices 11, 12 typically include software clients, which are software modules or applications that operate on or in conjunction with their respective communications device to provide access to data stored at one or more of the data storage devices 16, 18, and 20 through the protocol interface device 14. Those skilled in the art will appreciate that such communications devices also include further components and/or software modules, which have not been explicitly shown in FIG. 1 for clarity of illustration. With respect to the mobile wireless communications device 11, its software client communicates with the protocol interface device 14 via a wireless communication network 13, and perhaps other networks as well (e.g., a public switched telephone network (PSTN) or the Internet), as will be appreciated by those skilled in the art.

The various functions and operations of the protocol interface device 14 are preferably implemented in software operating thereon, or in conjunction therewith. The protocol interface device 14 illustratively bridges the software clients of the communications devices 11, 12 and the data storage devices 16, 18, 20. Communications between the protocol interface device 14, the communications devices 11, 12, and the data storage devices 16, 18, 20 are preferably via a wide area network (WAN) such as the Internet. That is, the communications devices 11, 12 may communicate with the protocol interface device 14 via the Internet, as noted above, and so too may the protocol interface device communicate with the data storage devices 16, 18, 20.

Of course, other implementations are also contemplated. For example, the protocol interface device 14 may be implemented in a private network that also includes the data storage devices 16, 18, 20, the communications devices 11, 12, or both the data storage devices and the communications devices (e.g., in a WAN). It should be noted that the present invention is in no way limited to any particular connection or communication scheme.

The data storage devices 16, 18, 20 store data to be accessed by the software clients of the communications devices 11, 12. Although some software clients are configurable to directly access certain types of data storage devices, they are often data system specific or protocol specific, as described briefly above. More particularly, on constrained electronic devices such as the mobile wireless communication device 11, processor power, memory resources, and communication channel characteristics may preclude the installation and operation of software clients having the same capabilities as those commonly used on desktop and laptop computer systems, for example. In addition, while the installation of multiple software clients for accessing data storage devices associated with different protocols is feasible for desktop and laptop computer systems, providing multiple-protocol support on such constrained devices may not be possible.

The data storage devices 16, 18, 20 are accessible using different operating protocols or access schemes. As such, the protocol interface device 14 accesses the data storage devices 16, 18, 20 via an operating protocol supported by respective data storage devices, and provides data to the communications device 11, 12 via a respective client-supported operating protocol. The protocol conversion functionality of the protocol interface device 14 provides a unified approach to support access to multiple types of data system. As described in further detail below, the protocol interface device 14 provides an "any-to-any" bridge between different protocols or access schemes.

Figure 2:
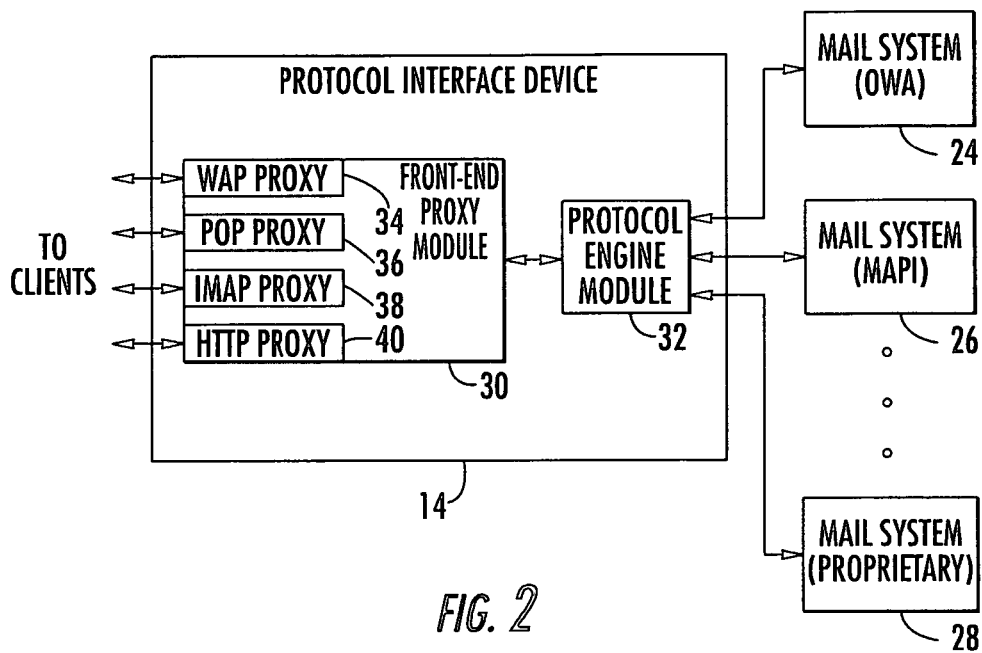
FIG. 2 is a schematic block diagram illustrating the protocol interface device of the communications system of FIG. 1 in greater detail.

The protocol interface device 14 is illustrated in further detail in FIG. 2. As noted above, the protocol interface device 14 bridges different types of communications devices with different types of data storage devices. In the illustrated embodiment, data storage devices 24, 26, 28 are systems/servers for storing electronic mail (e-mail). However, it should be noted that the present invention is not limited to mail system access. Each of the mail systems 24, 26, 28 supports a different operating protocol or access scheme. More particularly, the mail system 24 supports Outlook Web Access (OWA), the mail system 26 supports Microsoft Messaging Application Programming Interface (MAPI), and the mail system 28 supports a proprietary protocol, such as that used by America Online (AOL), for example.

The protocol interface system 14 illustratively includes a front-end proxy module 30. The front-end proxy module illustratively includes proxy modules 34, 36, 38, 40 which respectively support the Wireless Application Protocol (WAP), the Post Office Protocol (POP), the Internet Message Access Protocol (IMAP), and the Hypertext Transfer Protocol (HTTP) for communication with clients.

The front-end proxy 30 also communicates with a protocol engine module 32. The protocol engine module 32 translates OWA, MAPI, the proprietary protocol of the mail system 28 (and other protocols, if desired) into a format compatible with the front-end proxy module 30. To this end, a respective interface connector module may 70-77 (FIG. 7) be coupled to the protocol engine module 32 for each of the operating protocols used by the mail systems 24, 26, 28, as will be discussed further below. In a preferred embodiment, the front-end proxy module 30 and the protocol engine module 32 are extensible or expandable to accommodate additional operating protocols as they become available, as will also be discussed further below.

In operation, a user accesses a mailbox on one of the mail systems 24, 26, 28 through client software on his communications device. For example, a WAP browser on a mobile wireless communication device communicates with the WAP proxy module 34 to access the mail system 24. Access commands or instructions received by the WAP proxy 34 are converted into a format compatible with the protocol engine module 32. Communications between the front-end proxy module 30 and the protocol engine module 32 are preferably achieved via a common interface protocol, which may be a proprietary protocol or an established public protocol.

The protocol engine module 32 then translates the access commands or instructions received from the front-end proxy module 30 into a protocol associated with the mail system to be accessed (e.g., OWA for the mail system 24). Data received from the mail system (e.g., e-mail messages, a list of new messages, calendar appointments, tasks, etc., depending on the particular mail system), the features that its access protocol supports, and the nature of the access command are translated into the common interface protocol and transferred to the front-end proxy.

The active proxy module (i.e., the WAP proxy module 34 in the present example) then formats the received data, or at least portions thereof, for the requesting client. Further commands from the client are also translated by the protocol interface device 14. Access commands from other types of clients are similarly processed. It should be noted that several mail systems may be accessed in response to a single access command, where a user has enabled multiple mailbox access through the protocol interface device 14.

The protocol interface device 14 thus allows clients using different operating protocols to access the mail systems 24, 26, 28, which also use different operating protocols. Access commands such as move, delete, create, send, fetch, and view, for example, that are generated at a client affect the data stored at the mail systems 24, 26, 28 instead of copies of the data. Through the protocol interface device 14, a client compatible with any one of the proxy modules 34, 36, 38, 40 is provided access to one or more of the mail systems 24, 26, 28. The client itself advantageously need not support the access protocol or scheme associated with the mail system(s) to be accessed.

Since the mail system protocol and the client protocol need not be compatible, feature support between the protocols may be different. For example, a POP client does not support the same features as OWA. The interface protocol used between the protocol engine module 32 and the front-end proxy module 30 is preferably designed to be able to represent a desired number of protocol-supported elements or features for a desired operating protocol. More specifically, the common interface protocol is preferably able to represent all protocol-supported elements for the most "capable" protocol (OWA in the present example), to provide the broadest possible feature support. Further still, the common interface protocol may support a full feature set across all supported protocols, if desired.

By way of example, the common interface protocol may be a proprietary protocol based on the Web-based Distributed Authoring and Versioning (WebDAV) protocol. An example of an authentication request using such a common interface protocol is provided as program listing #1, below. This exemplary authentication request routine allows the protocol interface device 14 to be authenticated by a mail system using a user identifier and password provided by a user, and it also retrieves a root folder and basic capabilities of a target mailbox on the mail system.

An exemplary inbox request in accordance with a WebDAV-based common interface protocol is set forth below as program listing #2. In accordance with this routine, responsive to an inbox request, the capabilities of the inbox in a target mailbox are queried, and then its contents are queried. Another example is provided below as program listing #3, which is for a folder search request in accordance with the aforementioned WebDAV-based common interface protocol. Here, a list of subfolders for a given folder is returned in response to this request. It will be appreciated by those skilled in the art that numerous other requests and operations may be used as well.

It should be noted that the software clients need not initiate data access requests in all embodiments. For example, in some embodiments the protocol interface device 14 may include (or communicate with) a polling or aggregation engine module (not shown) that prompts the protocol engine module 32 to aggregate messages for respective users from the mail systems 24, 26, 28 at predetermined intervals, as will be appreciated by those skilled in the art. The protocol engine module 14 would then cooperate with the front-end proxy module 30 to provide the aggregated messages to the respective software clients, as described above. Additionally, the front-end proxy module 30 need not communicate directly with the communications devices 11, 12 in all embodiments, but it may instead communicate therewith via an intervening mail system or server, for example. Thus, in the case where an aggregation engine module is used, the aggregated messages may be first transferred by the front-end proxy module 30 to an intervening mail server, which in turn provides the messages to the appropriate communications device, as will also be appreciated by those skilled in the art. Here again, the front-end proxy module 30 would use the appropriate protocol(s) supported by such intervening mail server for communicating therewith.

Figure 11:
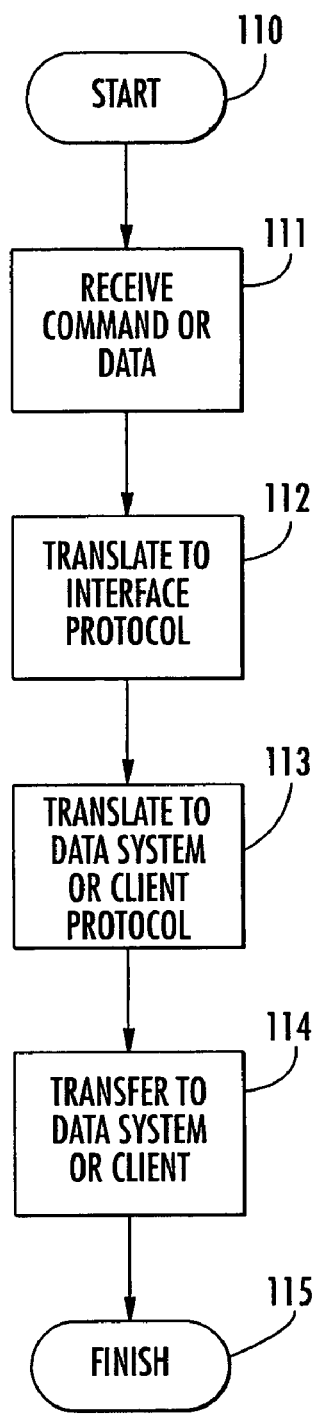
FIG. 11 is a flow diagram illustrating operation of the protocol interface device of FIG. 2.

A method for providing access to a plurality of data storage devices, such as the mail systems 24, 26, 28, using the protocol interface system 14 is illustrated in FIG. 11. Beginning at Block 110, an access command or data is first received, at Block 111. The access command or data is translated into the common interface protocol, at Block 112. An access command is then translated (Block 113) into a data system protocol associated with the data system to be accessed, such as OWA for the mail system 24, for example.

On the other hand, data is translated into the client protocol, at Block 113. Depending upon the particular features supported by the client protocol, only those portions of the data corresponding to elements of the interface protocol that are supported by the client protocol are translated during this step. The protocol interface device 14 may generate an error responsive to a non-supported operating protocol. More particularly, non-supported interface protocol elements are preferably ignored or processed according to a default or error-processing scheme. Translated access commands or data are then transferred to a data system or a client, at Block 114, thus concluding the illustrated method (Block 115).

Figure 3:
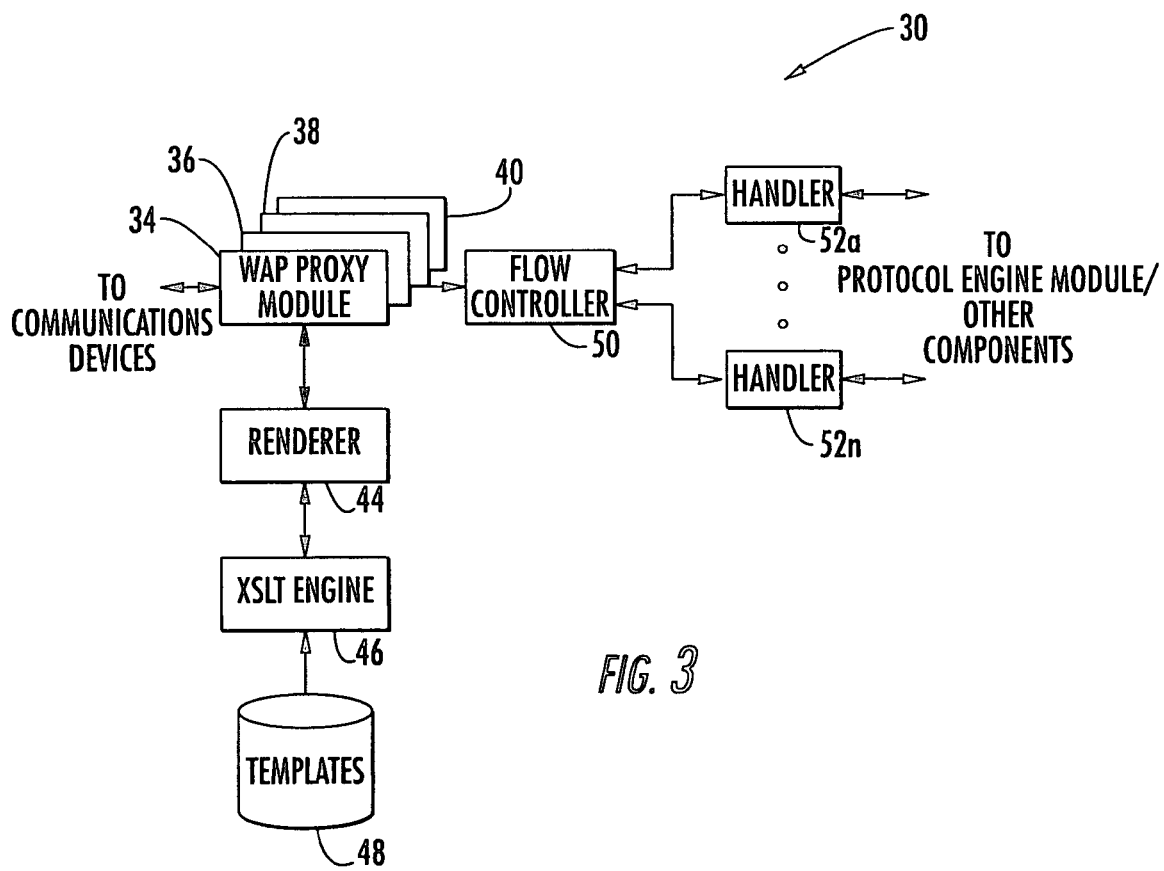
FIG. 3 is a schematic block diagram illustrating the extensible front-end proxy module of the protocol interface device of FIG. 2 in greater detail.

Turning now additionally to FIG. 3, an exemplary embodiment of the front-end proxy module 30 is now described. The front-end proxy module 30 illustratively includes the proxy modules 34, 36, 38, 40, a renderer module 44, an extensible stylesheet language transformations (XSLT) engine module 46, a memory or template store 48, a flow controller module 50, and handlers 52a-52n.

As noted above, each proxy module 34, 36, 38, 40 effectively "fronts" the protocol engine module 32 and translates respective operating protocols for different client types. For example, a WAP proxy module provides information retrieved from one or more of the handlers 52a-52n in the form of WML documents targeted for display on devices such as cell phones and PDAs. A POP proxy makes use of at least some of the same proxy components, including the flow controller module 50 and the renderer module 44 to render data in the form required by the POP protocol.

One particularly advantageous benefit of the illustrated front-end proxy module 30 is that each proxy module 34, 36, 38, 40 makes use of the same core services to route traffic, access data, and render data. In other words, the renderer module 44, XSLT engine module 46, template memory 48, flow controller module 50, and handlers 52a-52n provide a common core service module for the proxy modules 34, 36, 38, 40. The only differences between translations by the different proxy modules 34, 36, 38, 40 would be in the configuration of the flow controller 50, the handlers 52a-52n, and the XSL templates used to translate the data into its final form. It many cases, the same handlers 52a-52n will be re-used between by the various proxy modules 34, 36, 38, 40, as will be appreciated by those skilled in the art.

During operation, a data access request from a client is passed to the appropriate proxy module 34, 36, 38, 40 using standard mechanisms for the client protocol. For a WAP client, for example, parameters are passed via a query string and/or form variables. The WAP proxy module 34 determines a component identifier (which identifies a target item such as a mail folder), an action identifier (which identifies an action to be performed), and any parameters based on data in the request. In the case of WAP, the component and action identifiers are passed in the query string or form. Other parameters in the query string or form are packaged into a parameter list.

The active proxy module then calls the flow controller 50, passing along the identifiers and parameter list. The flow controller looks up the appropriate handler via the component and action identifiers and constructs the handler, passing the parameters as arguments to a constructor (not shown). Using the handler 52a as an example, this handler would processes the request, using a data layer (FIG. 5) to gather information needed for a response.

For mail system access, for instance, the data layer communicates with the protocol engine module 32 for any information related to the contents of the user's mailbox, calendar, or address book, for example. Communications with other components may be established for different types of information, such as information related to authentication services and a user's e-mail account. The handler 52a then decides whether the request should be forwarded to another handler, or if its results should be rendered.

All information passed back by the handlers 52a-52n is preferably in a common format, such as org.xml.sax.InputSource, for example, a provider of extensible mark-up language (XML) data. The active proxy module then calls the renderer module 44, passing along the InputSource, locale information, the name of the template to be rendered, and an OutputStream. The renderer module 44, making use of the XSLT engine 46, renders the page into the OutputStream. The OutputStream is then provided to the client by the active proxy module using the client protocol.

The above system provides a generic application framework following the classic model/view/controller (MVC) architecture that implements most of the application infrastructure. One important feature is that a base set of functionality may be defined for similar services and then extended to provide the service-specific functionality required to fully implement a given service. Within a given implementation, the flow controller 50, the handlers 52a-52n, and/or the data access layer are fully extensible or replaceable.

With this in mind, supporting a brand new service simply involves defining and implementing the data layer, defining the control flow and discrete actions within the system (i.e., the flow controller module 50), and defining and implementing the interface with the service (i.e., the renderer module 44). On the other hand, supporting a new type of client with an existing service involves making minor changes to, and extending actions within, the flow controller module 50 and handlers 52a-52n to support additional client-required functionality, and defining and implementing the interface between the client and the system (i.e., the renderer module 44).

Figure 12:
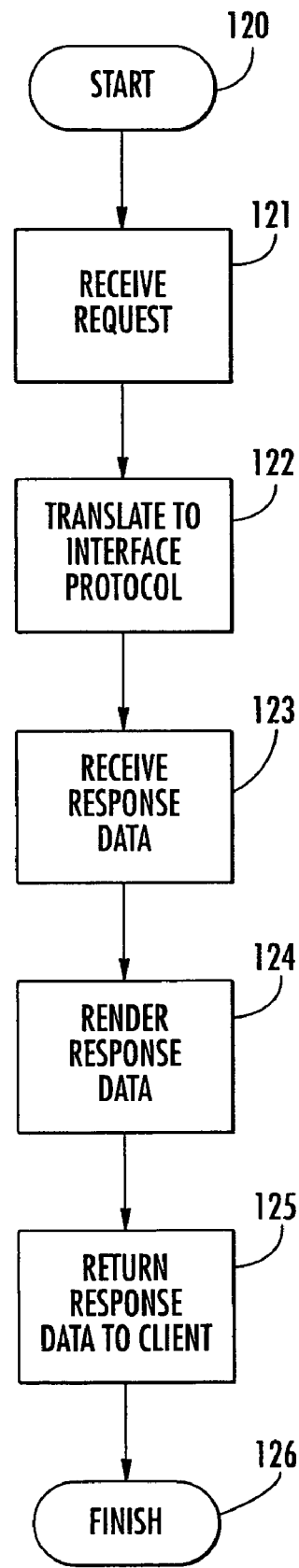
FIG. 12 is a flow diagram illustrating operation of the front-end proxy module of FIG. 3.

Operation of the front-end proxy module 30 to perform protocol translation is further described with respect to the block diagram of FIG. 12. Certain of the illustrated operations have been described in detail above, and thus will be described only briefly below to avoid undue repetition. Beginning at Block 120, an access request or command is received at a proxy module 34, 36, 38, 40, at Block 121. The access request is translated into the common interface protocol by one or more of the handlers 52a-52n, at Block 122.

Data is received from a given mail system 24, 26, 28 in response to the request, at Block 123. This data, which has already been translated into the common interface protocol by the protocol engine module 32, is rendered (Block 124) and returned to the client, at Block 125, thus concluding the illustrated method (Block 126). Depending upon the particular features supported by the client protocol, only portions of the data corresponding to elements of the common interface protocol that are supported by the client protocol are rendered or translated. Non-supported interface protocol elements may be ignored or processed according to a default or error processing scheme, as noted above.

Figure 4:
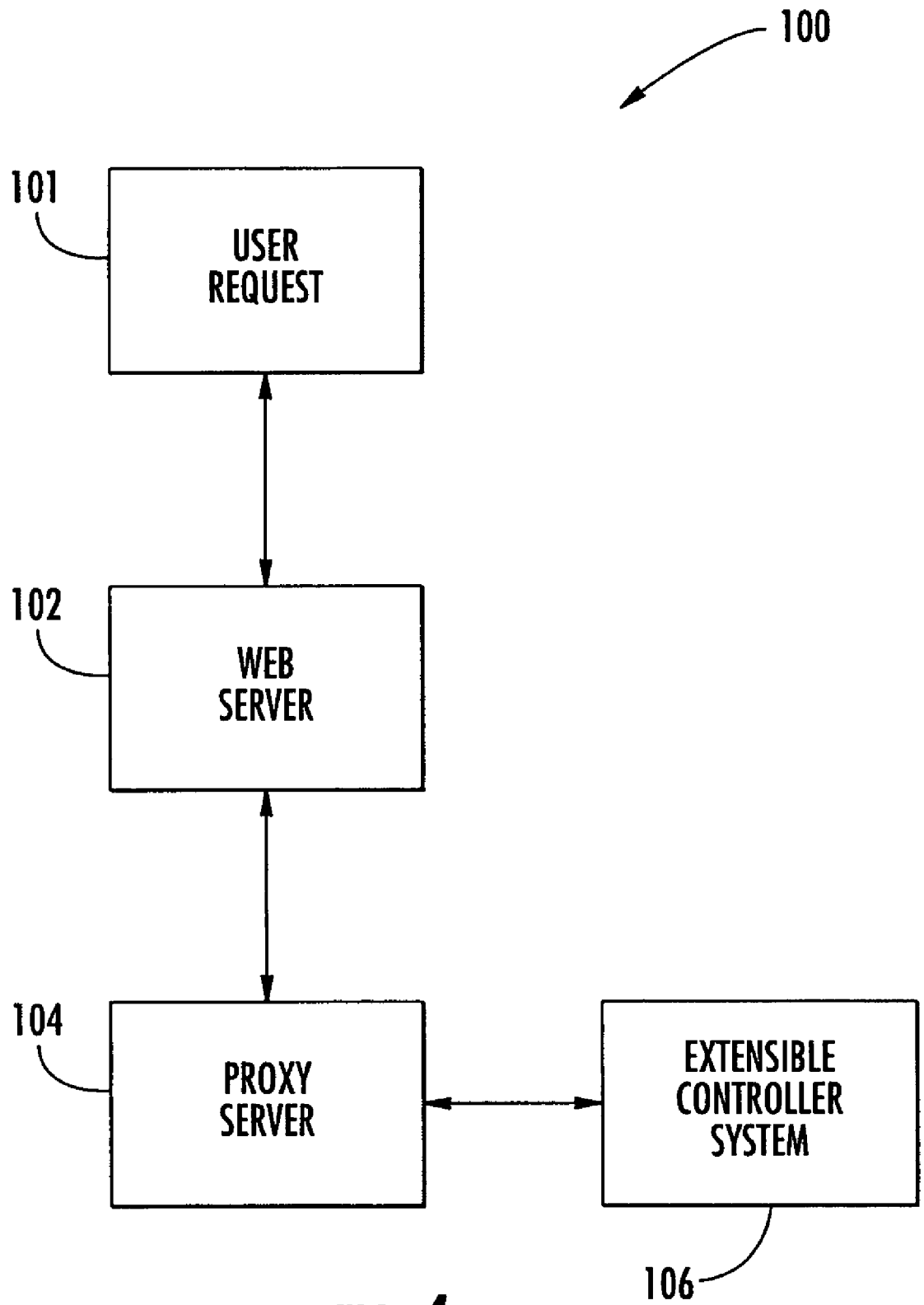
FIGS. 4 and 5 are schematic block diagrams illustrating an alternate embodiment of a communications system in accordance with the invention implementing an extensible proxy architecture similar to that of FIG. 3.
Figure 5:
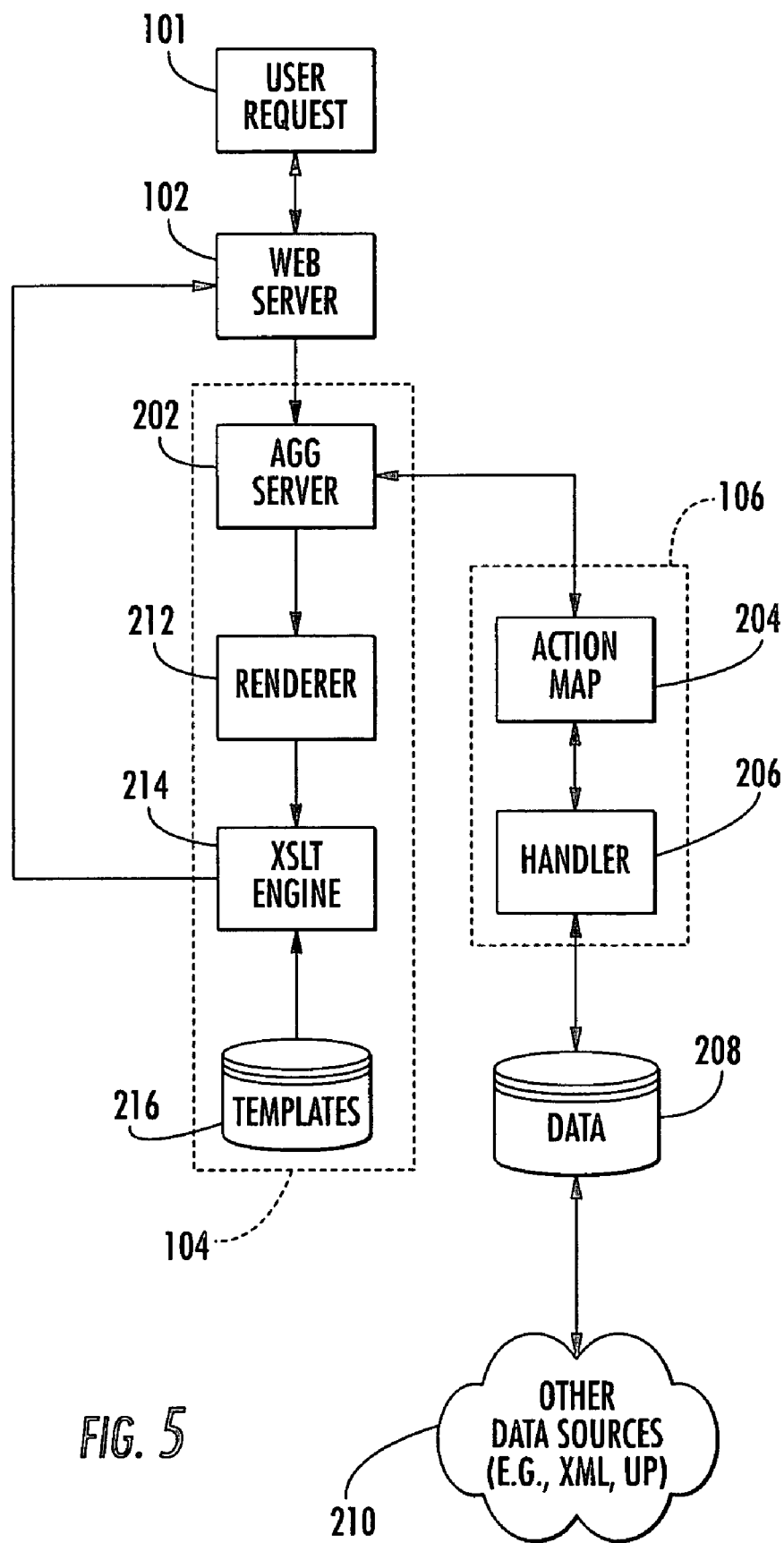

It should be noted that the extensible, common core service architecture of the front-end proxy module 30 may also be used for a variety of applications. One such application is to address various shortcomings of the disparate methods used to respond to HTTP requests from a Web application. Referring now to FIGS. 4 and 5, a Web data access system 100 having an extensible architecture in accordance with the present invention is now described. The components of the Web data access system 100 communicate bi-directionally, and they illustratively include a user request 101, a Web server 102, a proxy server 104, and an extensible controller system 106.

More particularly, the user request 101 refers to a user using a web browser or web application to request a web page (e.g., from a PDA or personal computer). Once the request is made, the Web server 102 processes the request. The proxy server 104 assists the Web server 102 in processing the request. For comparison purposes, the proxy server 104 here functions similar to the protocol interface device 14 discussed above, and the extensible controller system 106 would be implemented as a software module that is run on or in conjunction with the proxy server, as will be appreciated by those skilled in the art. Of course, in some embodiments the proxy server 104 and extensible controller system 106 could be implemented in different physical devices or servers, for example.

The proxy server 104 provides a process of providing cached or storage items available on other servers which are slower or more resource intensive to access. The proxy server 104 accepts URLs with a special prefix. When it receives a request for such a URL, it strips off the prefix and looks for the resulting URL in its local cache. If found, it returns the document immediately, otherwise it fetches it from the remote server, saves a copy in the cache, and returns it to the requester. The pages returned by the proxy server 104 can be either static or dynamic in nature. The proxy server 104 may communicate with application servers or data servers, and in this specific embodiment, the extensible controller system 106.

More particularly, the components of the proxy server 104 illustratively include an aggregate server 202, a renderer module 212, an XSLT engine module 214, and a memory 216 for storing a series of templates, similar to those described above. The components of the extensible controller system 106 include an action map 204, and a series of handlers 206, also similar to those discussed above.

The aggregate server 202 performs the processing of incoming information and passes it onto other components for assistance. The renderer module 212 renders the resultant data into a viewable format. The renderer module 212 makes use of the XSLT engine module 214 and any necessary templates from the memory 216 to render the page.

The aggregate server 202 sends data to the action map 204, which maintains the control flow and handles the business logic in the system. The action map 204 interacts with a series of handlers 206. The handler 206 utilizes the data layer 208 to retrieve information from other data sources 210. The other data sources 210 may include, for example, XML for web data, a universal proxy for any information related to the contents of user applications (e.g., e-mail, calendar or contact), or a provisioning API for authentication services and data relating to a user account.

The system functions by having a user send in a URL as a user request 101. This request is received at the Web server 102, which passes on to the proxy server 104 for processing using standard mechanisms for the protocol. For example, a WML request would pass a WAP parameter query string and/or form variables. The aggregate server 202 component of the proxy server 104 determines the component ID, action ID and any parameters based on data in the request. Using the same WAP example, the component and action IDs are passed in the query string or form. All other parameters in the query string or form are packaged up into a parameter list.

The aggregate server 202 then calls the action map 204 of the extensible controller system 106 and passes along the IDs and parameter list. The action map 204 looks up the appropriate handler 206 via the component and action IDs and constructs the handler, passing the parameters as arguments to the constructor. The handler 206 processes the request, using the data layer 208 to gather information needed for a response. The data layer 208 will retrieve information from other data sources 210 located within the network or external to the network. The handler 206 then decides whether the request should be forwarded to another handler 206, or if its results should be rendered.

If the system decides to render the data, the data is passed from the handler 206, back to the action map 204, and back to aggregate server 202 of the proxy server 104. The aggregate server 202 then calls the renderer module 212, which invokes the XSLT engine module 214 and any necessary templates to render the data into a viewable output. This output is then returned to the Web server 102 to serve the data as a viewable web page as a result of the user request 101.

Figure 13:
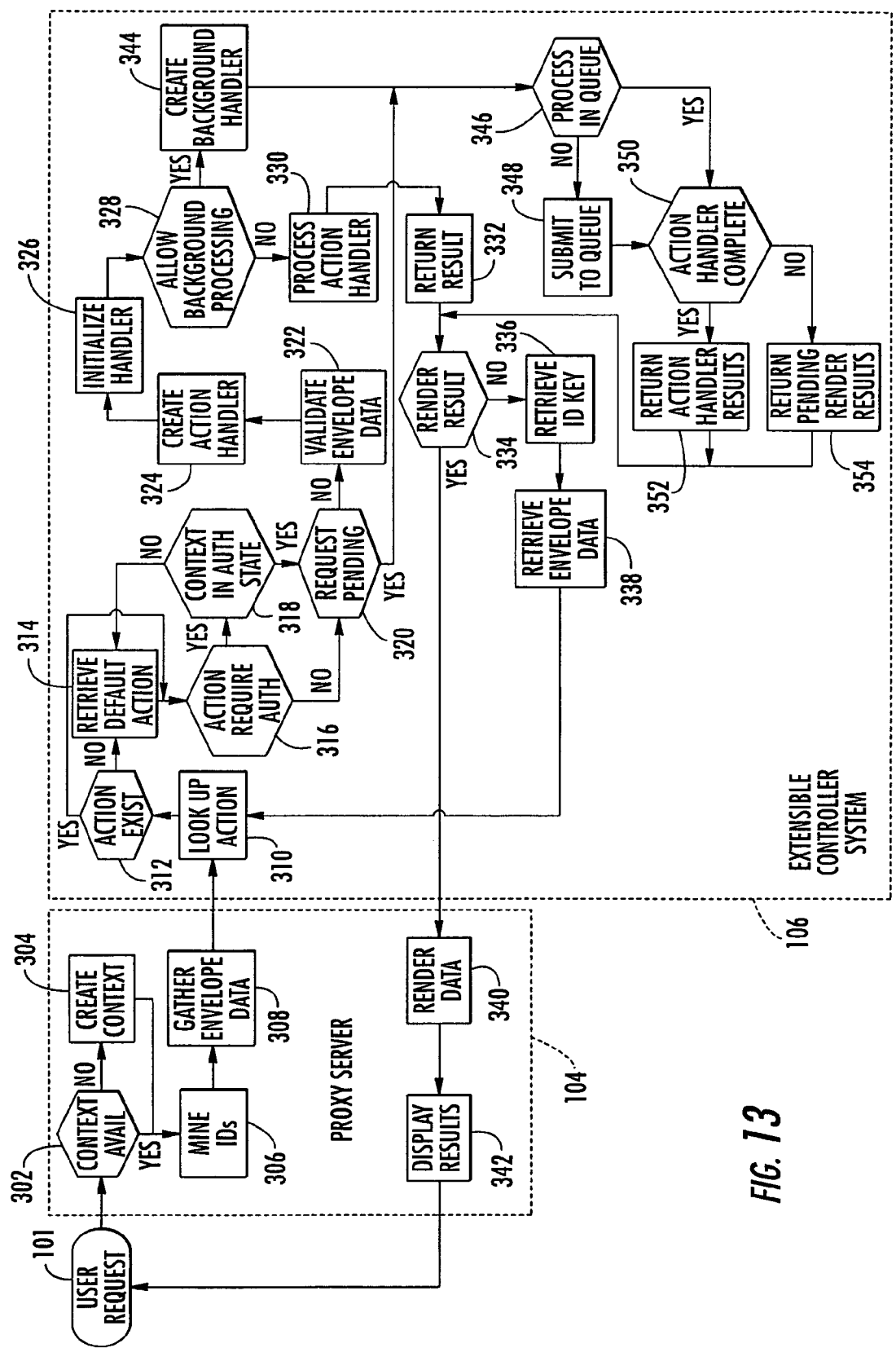
FIG. 13 is a flow diagram illustrating operation of the communications system of FIG. 5.
Figure 16:
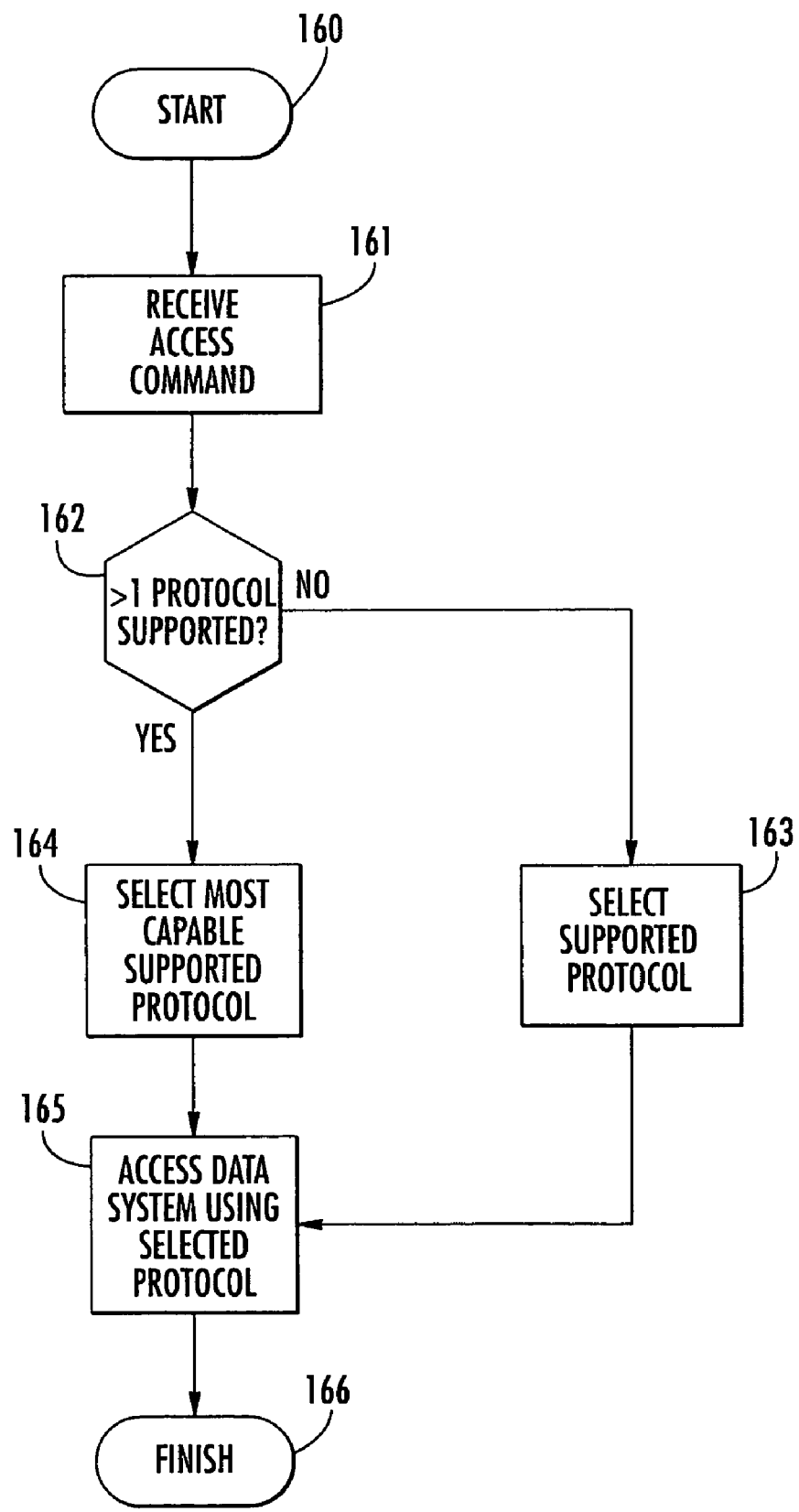
FIG. 16 is a flow diagram illustrating operation of the protocol interface device of FIG. 9.

The various steps involved in processing Web data using the extensible controller system 106 will now be further described with reference to FIG. 13. More particularly, this diagram illustrates in greater detail the processing and interaction of the proxy server 104 and the extensible controller system 106. The system flow begins with a user request 101. This request is sent to the Web server 102, which passes the information to the proxy server 104 for processing. The proxy server 104 invokes the aggregate server 202 for processing.

The aggregate server 202 determines whether a context is available, at Block 302. If it is available, the system will move to the next step to mine the IDs (Block 306). If it is not available, the system will first create the context, at Block 304, and then continue onto the step to mine the IDs, at Block 306. The action ID and component ID are also mined out of the system. These IDs, along with the request parameters and any form data, are packaged into an envelope and gathered together, at Block 308.

An invoke procedure is called to pass the data from the aggregate server 202 to the action map 204 of the extensible controller system 106. This invoke procedure will pass information pertaining to the envelope, an action code, the component ID and context info to the action map 204. The action map 204 looks up the action, at Block 310, and determines whether the action exists, at Block 312. If it does, then it moves to the next step to determine whether the action requires authentication, at Block 316. If the action does not exist, the system retrieves the default action, at Block 314, and then determines whether the action requires authentication, at Block 316.

At this point, if the action does not require authentication, the system determines if any requests are pending, at Block 320. If the action does require authentication, the system then determines whether the context is in an authenticated state, at Block 318. If the context is in an authenticated state, the system then determines whether a request is pending, at Block 320. However, if the context is not in an authenticated state, the system returns the request to the retrieve default action, at Block 314, until authentication is accepted.

At Block 320, the system determines if a request is pending. If a request is pending, the system executes on the pending request and jumps to next stage, determining whether a process is in queue, at Block 346. If no request is pending, the system executes on the action and validates on the envelope data, at Block 322, and passes control to the handler 206 to create the action handler, at Block 324. Once the action handler is created, it is initialized, at Block 326.

The system then determines whether background processing is allowed, at Block 328. If so, a background handler is created, at Block 344, and the system determines whether a process is in queue, at Block 346. However, if background processing is not allowed, the system then processes the action handler, at Block 330, and then returns the result, at Block 332. Revisiting the system, at Block 346 the system determines whether a process is in the queue. If the process is in the queue, it then determines whether the action is complete, at Block 350. If the process is not in the queue, then it submits it to the queue, at Block 348, and then determines whether the action handler is complete, at Block 350.

If the action handler is complete, the system returns the action handler result, at Block 352. If the action handler is not complete, the system returns the pending render result, at Block 354. The output of the steps illustrated at Blocks 352 and 354 (returning either an action handler result or pending renderer result) will be used to determine whether to render the result, at Block 334.

More particularly, the results of the steps illustrated at Blocks 332 (return result), 352 (return action handler result) and 354 (return pending render result) are used to determine whether to render the result (Block 334). If the system decides to render the result, the system sends the data from the extensible controller system 106 to the proxy server 404 and renders the data, at Block 340, at the renderer module 212. The data is then passed onto the Web server 102 to display the result, at Block 342, as a response to the user request 101. However, if the system decides not to render the result and has instead decided to forward the request to another action handler for processing, the system retrieves the ID keys, at Block 336, retrieves the envelope data, at Block 338, and then looks up the appropriate action, at Block 310. The system will loop around at this point until a decision to render a result is ultimately accepted, at Block 334.

The above-described method involves using a single source for defining the components within the system. In this particular embodiment, the source is an XML file, but other formats could be used as well, as will be appreciated by those skilled in the art. This source would define the code that handles the request, the URL syntax and parameters, templates or code used to generate the response for the request, and the routing information for the request, for example.

The code that handles the request, along with the parameter definition, is used by the system to create the action handler, pass the correctly typed parameters, and pass control to it for processing. The parameters include type information allowing for strongly typed data. The parameters may also be defined as optional or required. The template or templates are used to generate the response for the request. If an attempt is made to generate a response other than to what was defined an error is generated.

The source would also define the routing information for the request. Often times, it is desirable for a handler to perform work within its scope and then hand off control to another handler to allow it to perform its work. However, if the handler attempts to hand control to something not defined in the source, an error is generated.

Other variations are also possible. For example, the source may be used whenever generating URL's for use within the system. Moreover, request routing may be separated from the actual processing of those requests. Control flow is then handled by one component of the system, not by each handler. The handler would then simply ask the controller to forward a request to another handler. Thus, incoming data may be kept in a known state for the life of a particular request.

Yet another approach involves enforcing control flow through the system where one handler does not call another handler directly to do its work. Still another approach involves keeping the handlers relatively small and simple. That is, this will limit the handler's purpose and scope to receiving requests and calling the appropriate business logic to gather the desired results. Another variation involves keeping each handler focused on one task, and upon completion of the task, allowing the results to be rendered or forwarded on to the next handler.

A further variation involves providing an extensible mechanism for handling requests that can handle immediate needs, as well as grow over time without becoming overly complex. When loading the system, the user is able to specify a primary and secondary action map. In this way, generic business logic and control flow may be specified by the primary action map while still providing the user with a method of adding or modifying the functionality. Another approach is to provide the developer with a generic mechanism for responding quickly to long running requests to avoid generating a timeout. This enables the developer to specify background processing at either a handler level, or at the entire system.

The above-described extensible controller is particularly advantageous for addressing shortcomings in Web or HTTP-based applications. Of course, it will be also appreciated by those skilled in the art that this same architecture may be extended to support other types of non-HTTP based applications as well.

Figure 6:
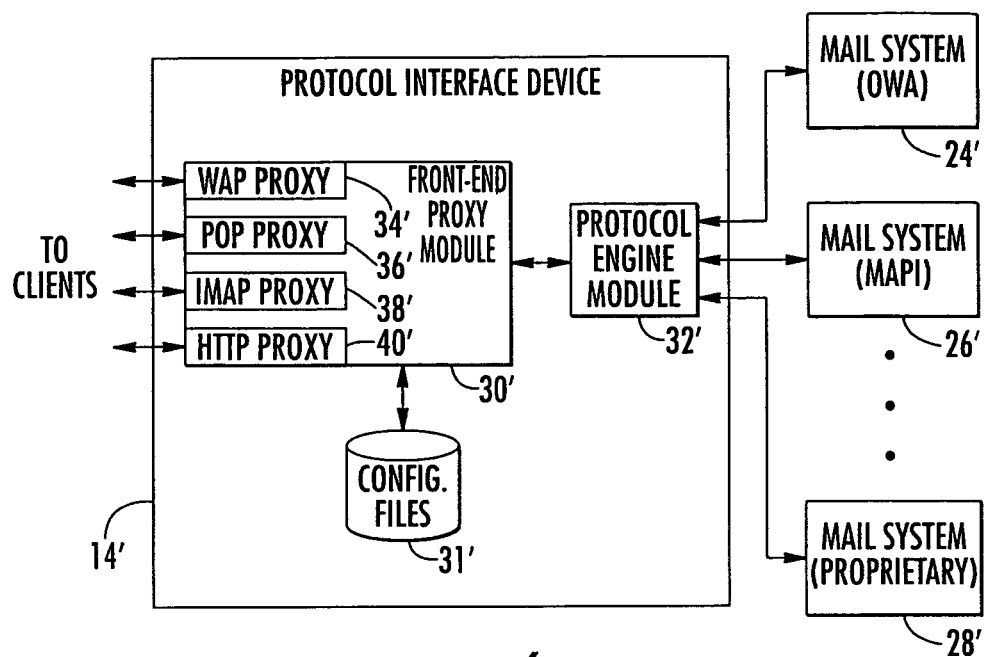
FIG. 6 is a schematic block diagram of an alternate embodiment of the protocol interface device of FIG. 2.

Turning now to FIG. 6, an alternate embodiment of the protocol interface device 14' is now described. In the illustrated embodiment, all requests to a data storage device, such as the mail systems 24', 26', 28', are defined in configuration files stored in a configuration file store or memory 31'. In this way, for a given client category, an application developer can easily request only those properties required to support the client for which it was written.

A resource manager, which may be part of the front-end proxy module 30' or a separate component of the protocol interface device 14', advantageously allows a user to specify a primary and secondary set of configuration files. If a secondary configuration file is specified, any resources defined in it will override those specified in the primary configuration file. This allows the user to specify a core set of resources and then tweak them to fit a particular implementation.

Moreover, configuration files may be stored for processing operations at different network layers. For example, configuration files for data layer operations for interfacing the front-end proxy module 30' and protocol engine module 32' may be stored in the memory 31', as well for upper network layer operations performed by the flow controller module 50, for example. Other types of configurations files may be used as well, as will be appreciated by those skilled in the art.

A configuration file also preferably specifies the implementation class that is created to handle the response to a given request. This makes it a simple matter to slightly change the behavior of an object in a data model, or even completely replace it. Caching behavior and strength for each request may also be specified in a configuration file. With a combination of these two properties, a developer can have much greater control over memory consumption and response/request performance.

In addition, configuration files also allow a user to specify multiple requests for a given resource. This makes it possible to support data systems with different request/response formats. An exemplary configuration file is provided below as program listing #4. This configuration file is suitable for a data store that supports a WebDAV interface, as discussed above, or in the case of the protocol interface device 14', a protocol engine that supports a WebDAV interface. However, it could be used for other types interfaces/data stores as well.

It should also be noted that, in addition to the content class specified for the resource, a user may also specify a command to further identify a given resource. This allows the user to perform multiple different operations on a given resource type, as will be appreciated by those skilled in the art.

Operation of the protocol interface device 14' using configuration files will now be described further with reference to FIG. 14. Beginning at Block 140, an access request or command is received at a proxy module, at Block 141. The access request is translated into the common interface protocol by a handler 52a-52n, at Block 142, with reference to one or more configuration files. Data that is received from the data system (Block 143) in response to the request, and which has already been translated into the common interface protocol by the protocol engine module 32', is formatted into a response and rendered, at Block 144. Again, this is done with reference to one or more configuration files. The rendered response is then returned to the client (Block 145), thus concluding the illustrated methods, at Block 146.

Figure 7:
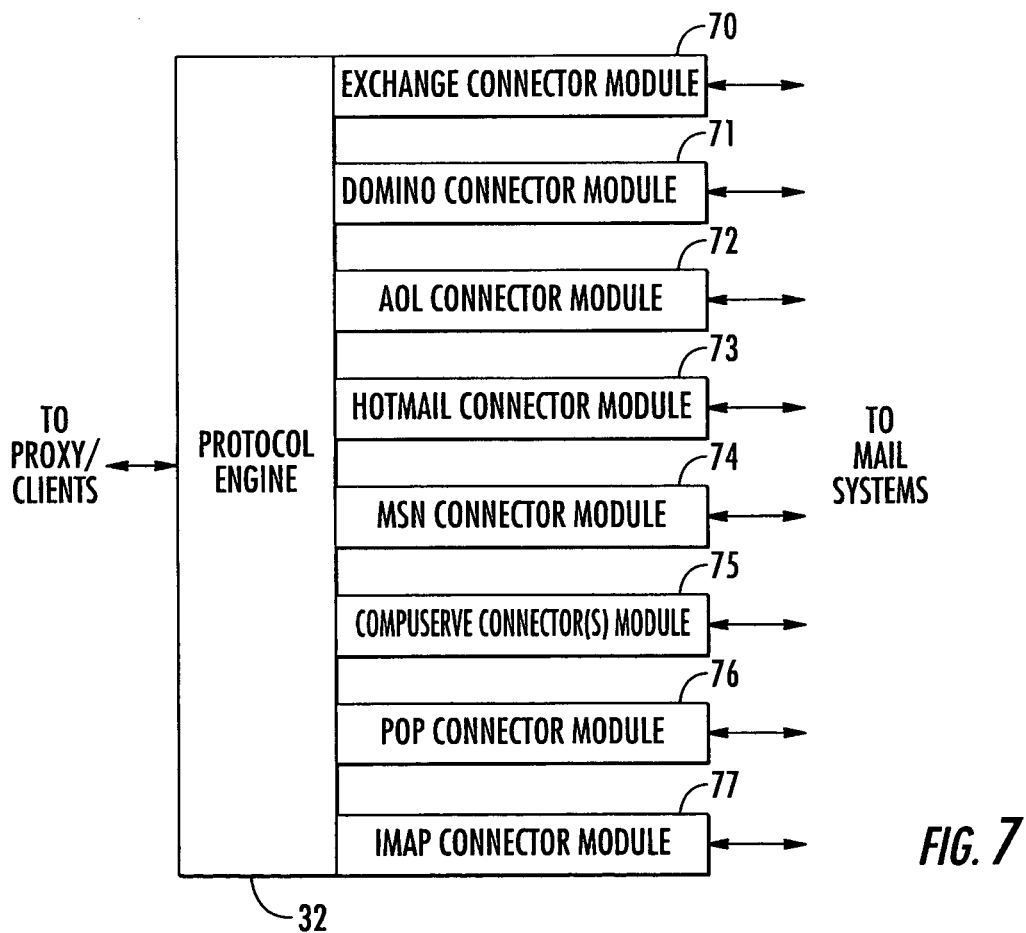
FIG. 7 is a schematic block diagram further illustrating the protocol engine module of the protocol interface device of FIG. 3 and interface connector modules therefor.

Referring now additionally to FIG. 7, the protocol engine module 32 will now be described in further detail. The protocol engine module 32 provides a framework to incorporate various interface connector modules 70-77 that communicate with various mail systems using different protocols. The protocol engine module 32 also provides a common interface XML and WebDAV, for example, that the clients, through the front-end proxy module 30, use to access various mail accounts. Common operations like retrieving only the essential headers of new mail and determining the presence and size of attachments without downloading them are highly efficient. All operations are performed directly on the source, and only the essential data is retrieved.

The protocol engine module 32 uses an appropriate one of a plurality of interface connector modules 70-77 to access a mail account. All of the connector modules 70-77 preferably support a common application programming interface (API), such that adapting the protocol engine module 32 to support a new protocol amounts to simply adding a new interface connector module. The connector modules 70-77 may be written in Java, for example, although other suitable languages or protocols may also be used. Overall system performance and availability may be improved, for example, by providing multiple dynamically load-balanced protocol engine machines.

Results received by the protocol engine module 32 from the mail systems 24, 26, 28 are similarly translated into the common interface protocol for translation into a client-supported protocol, if necessary, and transmission to a client. The results communicated back to a client preferably include only data that was requested by the client. Data corresponding to features that are supported by a mail system protocol but not by a client protocol may be translated into the common interface protocol, but it may also be ignored or handled according to a default or error processing scheme, as noted above.

A method of protocol translation using the protocol engine module 32 and interface connector modules 71-77 is now described with reference to FIG. 15. Beginning at Block 150, an access request or command is received, at Block 151. The access request is translated into a protocol supported by the target data system, at Block 152. Data is received from the data system in response to the request, at Block 153, and it is translated into the common interface protocol, at Block 154. Further translation of the data into a client protocol may be performed, if necessary, at Block 155, and the data transmitted to the client at Block 156, thus concluding the illustrated method, at Block 157.

Again, depending upon the particular features supported by the client protocol, only portions of the data corresponding to elements of the common interface protocol that are supported by the client protocol are translated. As described above, non-supported interface protocol elements may be ignored or processed according to a default or error processing scheme.

Figure 8:
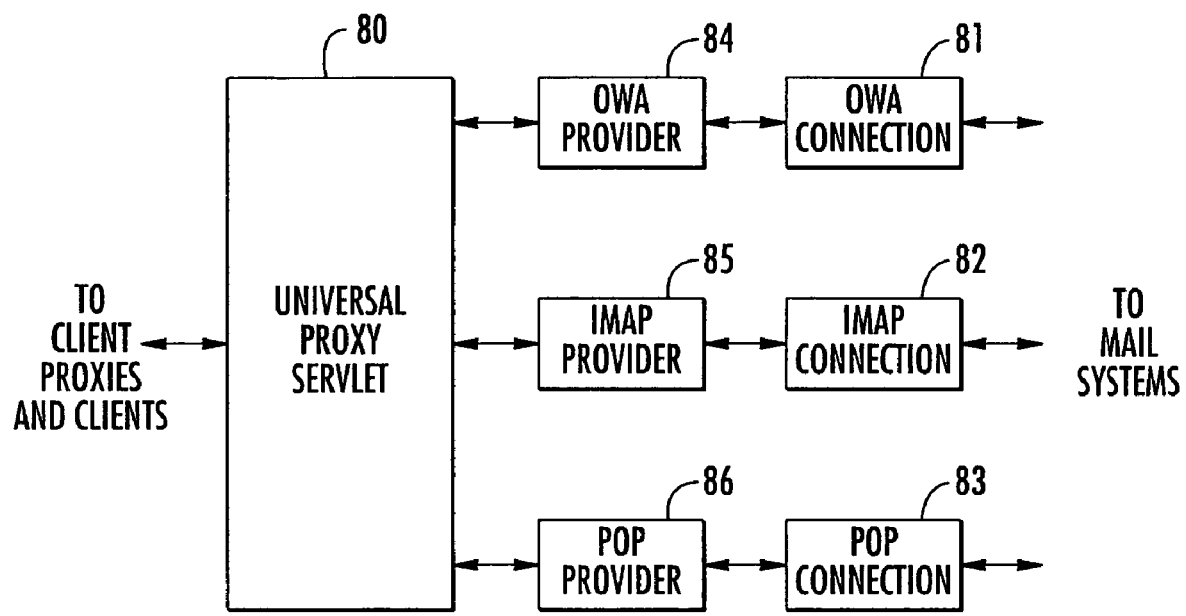
FIG. 8 is a schematic block diagram of an alternate embodiment of the protocol engine module and interface connector modules of FIG. 7.

Turning now to FIG. 8, an alternate embodiment of the above-described protocol conversion module architecture is now described. Here, the protocol engine module 32 takes the form of a universal proxy (UP) servlet module 80, and each interface connector module 81, 82, 83 and a respective provider module 84, 85, 86 are associated with different operating protocols. In the illustrated example, the different protocols are OWA, IMAP, and POP. Further or different protocols may be supported by corresponding provider/connection pairs, as will be appreciated by those skilled in the art.

For a common interface protocol, such as the proprietary interface protocol described above, the UP servlet module 80 takes incoming common format requests and translates them into calls, using the defined interfaces, to the interface connector modules 81-83. The UP servlet module 80 also takes the results of these calls and formats them into common format requests. Each common format request includes a method request and a path in the form of a URL. It may also include an XML document that provides additional parameters for the request.

Conceptually, below the UP servlet module 80 there is a provider module 84-86 for each supported mail system protocol. The providers take care of handling the calls made by the UP servlet module 80. As shown, each provider has a connection, which takes care of communicating with the source mailbox/account on a target mail system. Initially, the connection will also be the provider.

The interfaces used by the UP servlet 80 and implemented by the provider modules 84-86 define a loose folder hierarchy. In fact, it may be conceptualized as a collection of collections of items. An item can be a message, a folder, or a contact, for example, or any other data item to be represented. Each item has a defined type (e.g., mail, contact, appointment). An interface for each type of item defines the properties and actions that are available for that type of item. A folder item includes a collection of items, and provides methods to enumerate the items within a folder.

The connector interface modules 81-83 provide a common way for the UP servlet module 80 to communicate with different provider modules/interface connector modules. Some connector modules may only implement a subset of the protocol and/or may only support a single folder (collection) of items, as in the case of POP.

The basic flow for an exemplary common format request proceeds as follows. The UP servlet module 80 receives the request, and it either retrieves or creates the appropriate provider/connection. The UP servlet module 80 then calls an appropriate "get folder" or similar function associated with the interface connector module, passing a target mail system identifier, such as a URL that was included in the common format request. The interface connection module returns a reference to some object that implements the folder interface and represents the requested folder. In its simplest implementation (e.g., POP), a single object could be the interface connector module and also represent the mailbox folder.

The UP servlet module 80 uses the returned folder reference to make additional calls to satisfy the common format request. For example, if the UP servlet module 80 needs to retrieve a specific item, it may first call a "get folder" function, passing the requested URL, and after it has the folder, it will then call a "get item" function, again passing the URL. The results of the call(s) are then formatted into an appropriate format, such as XML, and returned in an HTTP response.

It will be up to the provider module/interface connection module to interpret a URL passed in and return the appropriate reference. This will not be complicated because the provider module/interface connection module provides the URLs in the first place. The only URL that any interface connection module will be required to know about is "\". All other URLs are generated by the provider/connection. As long as the URLs within the hierarchy/collections are unique, the provider will be able to resolve to the correct item when a "get" function is called.

The provider modules 84-86 and interface connection modules 81-83 preferably support a root folder. If only a root folder is supported, then inbox, calendar, and contact items (as appropriate) should be items within that folder if they are to be accessible through a protocol engine.

In accordance with one aspect of the invention, a single, advantageous mechanism to access various types of protocols is provided. This mechanism supports the full functionality of each data system protocol for similarly capable client protocols, and degrades when a specific data system protocol feature is not supported by a client protocol. Requests received in a common format are translated into a provider/protocol specific format before forwarding the request on to the destination server. Responses from the destination server, which are in provider/protocol specific format, are translated back into the common format.

A mechanism for a client to query supported functionality for a specific provider module, giving the client greater control over how it generates requests to the provider, is also provided. Any client written to support the common protocol format, directly or through a proxy, can easily provide access to any mail store without concerning itself with the details of the mail store provider module/protocol.

Figure 9:
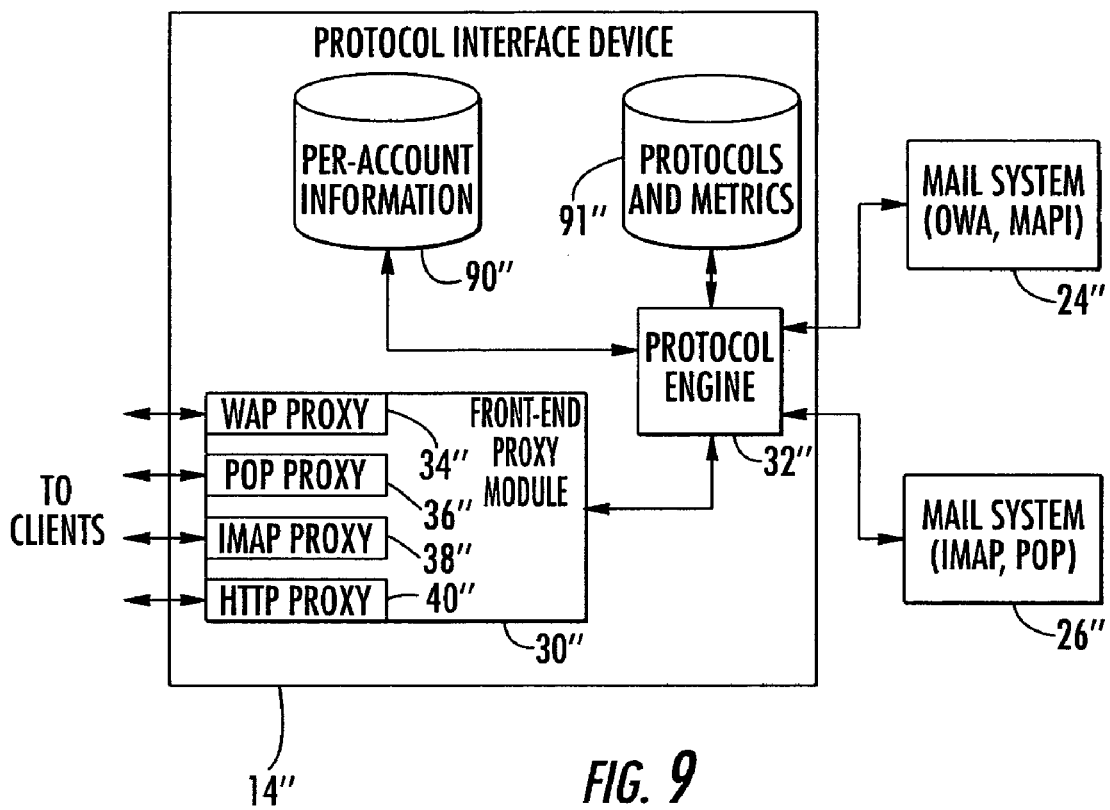
FIG. 9 is a schematic block diagram of still another alternate embodiment of the protocol interface device of FIG. 2.

Referring now additionally to FIG. 9, another embodiment of the protocol interface device 14" is now described. Here, user e-mail account information associated with e-mail accounts to be accessed through the protocol interface device 14" is stored in a data store 90". The per-account information preferably includes an indication of the access protocols supported for each e-mail account.

Records in the data store 90" may be arranged by an account identifier, such as an e-mail address, or by a user name associated with the protocol interface device 14" such that all e-mail account information for particular users is grouped in the data store 90", for example. Where access protocol support is the same for all e-mail accounts on each of the mail systems 24", 26", the per-account information may include mail system information indicating the operating protocols supported by each mail system.

A data store 91" stores a list of all operating protocols supported by the protocol engine module 32", and corresponding metrics (i.e., ranking) representing protocol preferences. These metrics are calculated based on capability criteria, such as the degree to which features of each mail system 24", 26" are supported by a protocol and the security level of a protocol, for example. Other criteria may also be used and will be apparent to those skilled in the art. In the data store 91", OWA would typically have a higher metric or ranking than MAPI, and IMAP would generally be ranked higher than POP. Each of the data stores 90", 91" may be implemented, for example, in a database on a local hard disk or other memory at the protocol interface device 14", or on a file server with which the protocol interface device communicates.

The protocol engine module 32" determines to which mailbox(es) or account(s) the command or instruction relates, and then accesses the per-account information in the data store 90" to determine whether more than one access protocol is supported for each account to be accessed. If only one access protocol is supported, then that protocol is selected. Where more than one access protocol is supported for the account, then the protocol engine module 32" accesses the data store 91" to determine which supported protocol is preferred or desired, and the supported protocol with the highest metric or ranking is selected. For the mail system 24", OWA is preferably selected over MAPI, and for the mail system 26", IMAP is preferably selected over POP.

The protocol interface device 14" thus allows access to the mail systems 24", 26" using a most capable supported protocol. Through the protocol interface device 14", a client compatible with any of the proxy modules 34", 36", 38", 40" is provided access to one or more of the mail systems 24", 26". The client itself need not support the access protocol or scheme associated with the mail system(s) to be accessed.

A method of data system access protocol selection using the protocol interface device 14" is now described with reference to FIG. 9. Beginning at Block 160, an access command is received from a client at Block 161. A determination is made (Block 162) as to whether each data system to be accessed in response to the command supports more than one access protocol. If so, then the most capable supported protocol is selected, at Block 164. Otherwise, the one supported protocol is selected, at Block 163. Each data system is accessed using the selected protocol, at Block 165, thus concluding the illustrated method, at Block 166. Where more than one data system is to be accessed, the protocol selection steps illustrated at Blocks 162-164 are preferably repeated for each data system.

It should be noted that the protocol and metric data store 91" is but one example exemplary of a protocol preference ranking technique that may be used in accordance with the present invention. Protocol preferences may be inherent in the ordering of a list of supported protocols, for example.

Further criteria than metrics or overall preferences may also be considered when selecting a protocol. The type of client from which the access command is received may also affect protocol selection. Where the access command is received from a POP client, for example, many of the enhanced features supported by OWA cannot be represented in POP for transfer to the device. If a user has only one type of client for accessing the protocol interface device 14", then the per-account information may be adapted to reflect the type of client or to limit the list of supported protocol based on the type of client. Otherwise, a further step in protocol selection may be to determine the type of client from which an access request is received.

Alternatively, a most capable protocol supported by a data system to be accessed may always be selected, and any incompatibility between the selected access protocol and the protocol supported by the client is handled during translation of data to the client protocol. Portions of data corresponding to elements of the interface protocol that are supported by the client protocol are translated, whereas non-supported interface protocol elements are ignored or processed according to a default or error processing scheme.

Generally speaking, clients often access servers through proxies. Also, the latency is often positively correlated to the cardinality of the collection being accessed (e.g., number of email messages in the mailbox being accessed). As will be evident from the following description, the present invention provides an apparatus and technique that may be used by the proxy to give the client the illusion that the collection being accessed is smaller than it really is. For example, a proxy may show only the 100 most recent messages in a mailbox, while the mailbox itself has 2000+ messages. The present invention advantageously allows this proxy to select a small subset of the collection that can be presented to the client in lieu of the entire collection without a significant impact to the user experience.

Figure 10:
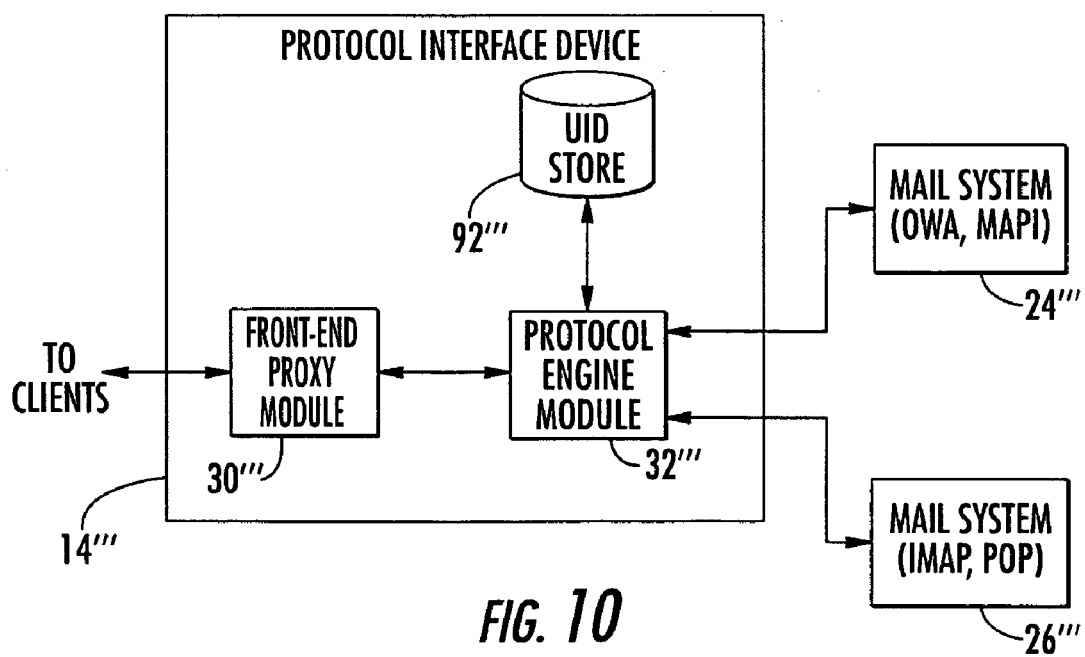
FIG. 10 is a schematic block diagram of yet another alternate embodiment of the protocol interface device of FIG. 2.

More particularly, turning now to FIG. 10, another advantageous embodiment of the protocol interface device 14''' is now described. Generally speaking, when a data access request is received from a client, the protocol interface device 14''' accesses one or more of the data systems 24''', 26'''. However, in some cases accessing the data systems and providing a response to the client might otherwise cause timeouts for certain client protocols, and longer than desired wait times for a user of a client after a request has been sent. Yet, in accordance with the present aspect of the invention, certain data may be stored at the protocol interface device 14''' which may be used to reduce response times.

More particularly, the protocol engine module 32''' polls the data systems 24''', 26''' to determine whether they currently store data items associated with users that have been configured for access thereof. Users are configured in the protocol interface device 14''' by establishing a user account associated therewith, for example. Polling is preferably performed in accordance with a polling interval. The polling interface may be a static predetermined polling interval, or an adaptive polling interval that can be adjusted based on operating conditions or the occurrence of particular events, as will be appreciated by those skilled in the art.

In response to a poll from the protocol engine module 32''', a given data system 24''', 26''' returns data items, or at least data item identifiers that can be used to retrieve the data items, to the protocol interface device 14'''. These data items or identifiers are then stored by the protocol engine module 32''' in the data store or memory 92'''.

In particular, the protocol engine module 32''' may determine whether new data items for a user are stored in any of the data systems 24''', 26'''. Where the data systems 24''', 26''' are e-mail systems, for example, the protocol engine module 32''' queries mailboxes associated with each user configured for e-mail access through the protocol interface device 14'''. For each mailbox query, a mail system returns, at a minimum, a list of unique identifiers (UIDs) associated with e-mail messages stored in the mailbox.

A current UID list is then compared with a previous UID list for the mailbox in the UID store 92''' to determine whether new messages have been stored in the mailbox at the mail system. If new messages are detected, an alert is preferably sent to a user's client by the protocol engine module 32''' in cooperation with the front-end proxy module 30''' (or another component of the protocol interface device 14'''), and the current UID list including the new messages is stored to the UID store 92'''.

One of the most common data access operations is viewing a listing of data items currently stored at data systems, especially where the data items are messages stored on mail systems. As described above, the protocol engine module 32''' polls one or more of the data systems 24''', 26''' to detect new data items based on a list of UIDs stored in the UID store 92'''. Therefore, the protocol interface device 14''' has a local listing of UIDs of data items that were stored at the data systems 24''', 26''' the last time the data systems were polled.

In accordance with the present aspect of the invention, the protocol engine module 32''' retrieves the stored UID list from the UID store 92''' when a "view items" or similar access request is received. This stored UID list, which is accurate to within the current polling interval, is then returned to the requesting client. This provides a much faster response time than accessing the data systems 24''', 26''' when the request is received, as will be appreciated by those skilled in the art.

In the case of a POP client, for example, the client times out if no response to a request is received within 30 seconds. Where the POP client is operating on a mobile wireless communications device, latency within the wireless communications network can cause delays that are significant relative to this limited response time. The faster response time associated with providing a stored UID list in response to a data access request is particularly advantageous in these types of scenarios. Even in the absence of such time constraints, a faster response time enhances the user experience at a client by reducing the wait time between sending a data access request and receiving a response.

As described above, the stored UID list is accurate to within the polling interval. When the stored UID list is provided to a client in response to a data access request, the protocol engine module 32''' preferably polls the data system(s) 24''', 26''' to determine whether the stored UID list is still accurate. If new items have been stored at the data system(s) 24''', 26''' since the last poll, then a new UID list is sent to the client. This further polling of the data systems 24''', 26''' is performed either according to the polling interval or initiated by the data access request.

It will be appreciated that the preceding description relates to "view items" or similar data access requests. Other types of data access requests may be processed by other components or modules of the protocol interface device 14'''. For example, such data access requests are translated, if necessary, by the front-end proxy module 30''', as described above.

The protocol interface device 14''' thereby allows access to the data systems 24''', 26''', and provides for reduced response times for various types of data access requests. Through the protocol interface device 14''', a client compatible with any of the protocols handled by the front-end proxy module 30''' is provided access to one or more of the data systems 24''', 26'''. The client itself need not support the access protocol or scheme associated with the data system(s) 24''', 26''' to be accessed, as noted above.

Figure 17:
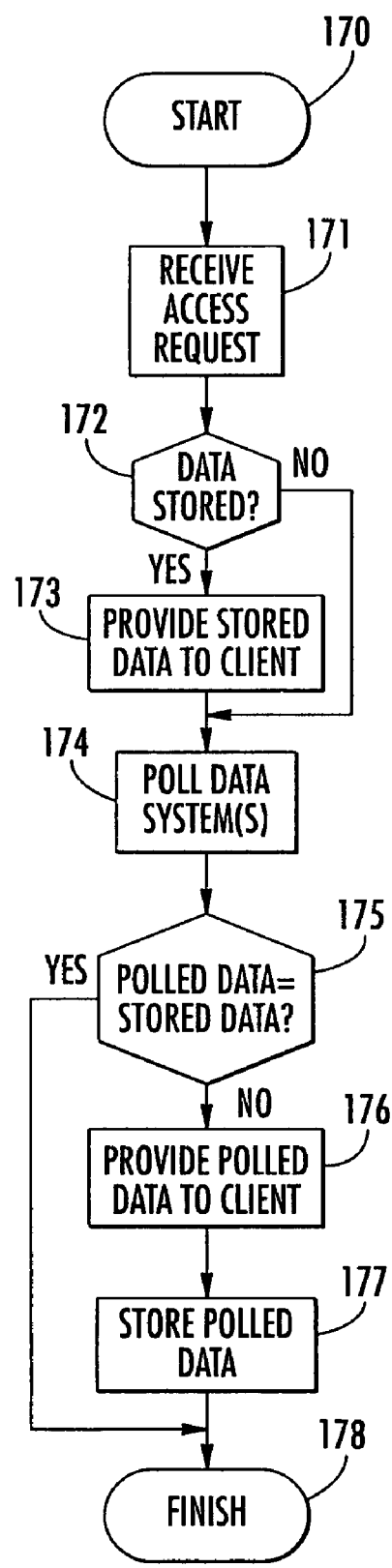
FIG. 17 is a flow diagram illustrating operation of the protocol interface device of FIG. 10.

A method of reducing response times for data system access requests using the protocol interface device 14''' is now described with respect to FIG. 17. Beginning at Block 170, a data access request is received at Block 171. A determination is then made, at Block 172, as to whether data pertinent to the data access request (i.e., a UID list) is locally stored. Where such data is in a local store 92''', then the stored data is provided to the requesting client, at Block 173. After the stored data has been transmitted to the client, or if no such data has been stored, the data system(s) 24''', 26''' to which the data access request relates is polled, at Block 174.

An optional step of determining whether the polled data received in response to a poll is different from the stored data may then be performed at Block 175. If so, this means that there is new data stored on the data system(s) 24''', 26''', and the data received in response to the poll is provided to the client, at Block 176. It is also locally stored in the data store 92''', at Block 177, thus concluding the illustrated method (Block 178).

By way of example, data access systems and methods according to aspects of the invention may be applied to other types of data storage devices than mail systems, and other protocols and access schemes than those specifically described above and shown in the drawings.

Additional features of the invention may be found in co-pending applications entitled COMMUNICATIONS SYSTEM PROVIDING REDUCED ACCESS LATENCY AND RELATED METHODS, Ser. No. 10/777,871; COMMUNICATIONS SYSTEM INCLUDING PROTOCOL INTERFACE FOR MULTIPLE OPERATING PROTOCOLS AND RELATED METHODS, Ser. No. 10/777,577; COMMUNICATIONS SYSTEM PROVIDING EXTENSIBLE PROTOCOL TRANSLATION FEATURES AND RELATED METHODS, Ser. No. 10/777,958; COMMUNICATIONS SYSTEM WITH DATA STORAGE DEVICE INTERFACE PROTOCOL CONNECTORS AND RELATED METHODS, Ser. No. 10/777,959; COMMUNICATIONS SYSTEM PROVIDING MULTI-LAYERED EXTENSIBLE PROTOCOL INTERFACE AND RELATED METHODS, Ser. No. 10/778,709; and COMMUNICATIONS SYSTEM INCLUDING PROTOCOL INTERFACE DEVICE PROVIDING ENHANCED OPERATING PROTOCOL SELECTION FEATURES AND RELATED METHODS, Ser. No. 10/777,731, the entire disclosures of which are hereby incorporated herein by reference.

EXAMPLE

An exemplary hand-held mobile wireless communications device 1000 that can be used in the present invention is further described in the example below with reference to FIG. 18. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 18:
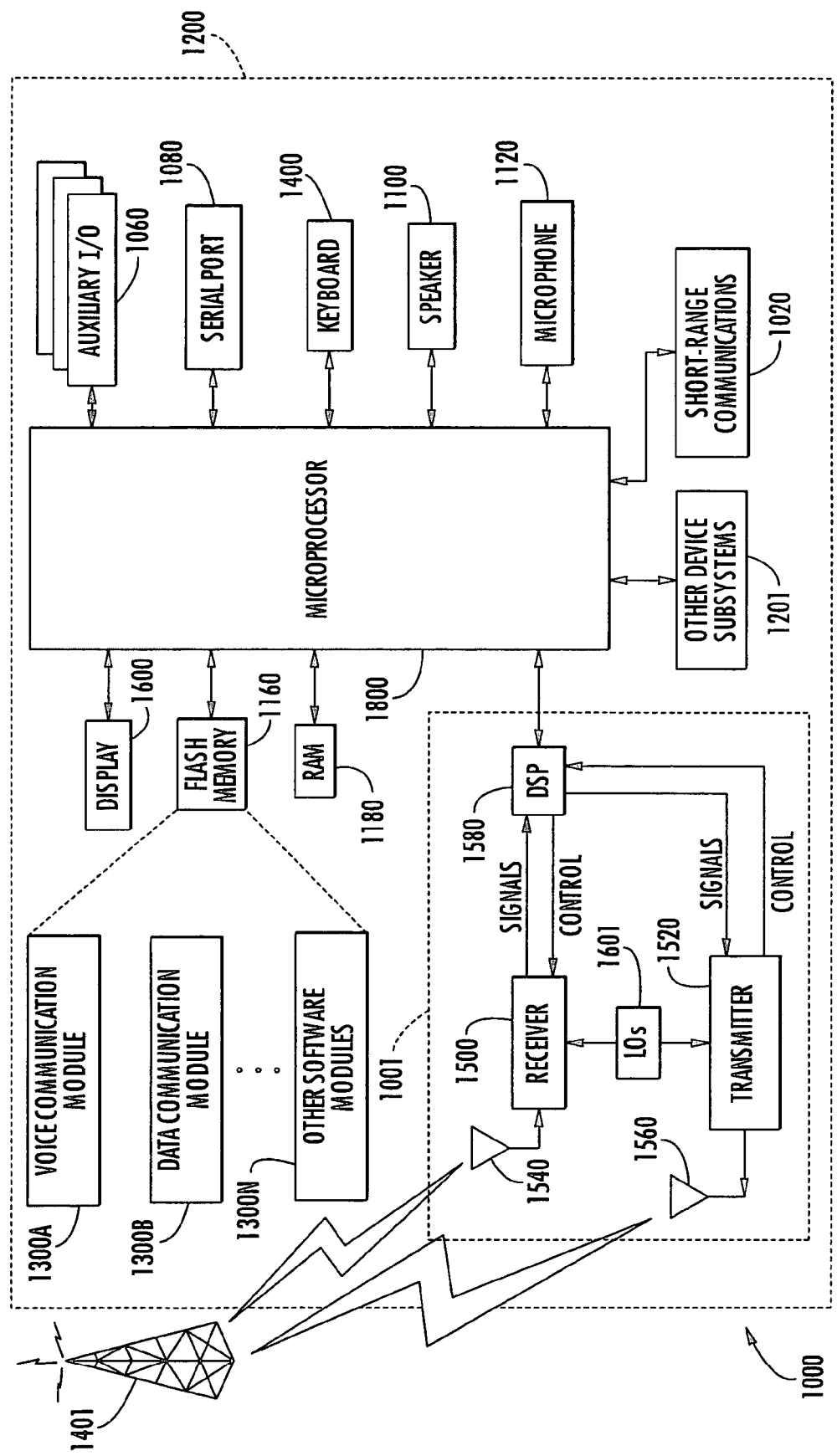
FIG. 18 is a schematic block diagram of an exemplary mobile wireless communications device for use with the present invention.

In addition to the processing device 1800, other parts of the mobile device 1000 are shown schematically in FIG. 18. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information. The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

---

Computer Program Listings

Program Listing #1 - Exemplary Authentication Request

```
PROPFIND /ups HTTP/1.1
Depth: 0
Brief: t
```

-continued

Computer Program Listings

```
    Pragma: no-cache
    Content-Type: text/xml
    X_UP_LOGIN:
svr=login.oscar.aol.com&prt=5190&ssl=0&pcol=aol&uid=******&pwd=******&pwp=
    X_UP_SYNC: false
    X_UP_REFRESH_CACHE: force
    X_UP_NEWCON: 1
    User-Agent: Mozilla/4.0 (compatible; MSIE 5.5; Windows NT 5.0)
    Connection: Keep-Alive
    Host: localhost:9080
    Content-Length: 664
    <?xml version="1.0"?>
    <D:propfind    xmlns:D="DAV:"    xmlns:h="http://schemas.microsoft.com/hotmail/"
xmlns:hm="urn:schemas:httpmail:" xmlns:up="urn:schemas:corp:universalproxy">
        <D:prop>
            <hm:contacts/>
            <hm:calendar/>
            <hm:journal/>
            <hm:notes/>
            <hm:inbox/>
            <hm:outbox/>
            <hm:sendmsg/>
            <hm:sentitems/>
            <hm:deleteditems/>
            <hm:drafts/>
            <hm:msgfolderroot/>
            <up:corporatecontacts/>
            <h:maxpoll/>
            <h:sig/>
        </D:prop>
    </D:propfind>
    HTTP/1.1 207 Multi-Status
    Set-Cookie: JSESSIONID=C70CD1AED7D2BE210B34D93F7ACD6935; Path=/ups
    Content-Type: text/xml
    Transfer-Encoding: chunked
    Date: Wed, 06 Aug 2003 18:20:28 GMT
    Server: Apache Coyote/1.0
    <?xml version="1.0" encoding="UTF-8"?>
    <D:multistatus     xmlns:D="DAV:"        xmlns:up="urn:schemas:corp:universalproxy"
xmlns:c="urn:schemas:calendar:"                    xmlns:a="urn:schemas:contacts:"
xmlns:hm="urn:schemas:httpmail:" xmlns:m="urn:schemas:mailheader:">
        <D:response>
            <D:href>http://localhost:9080/ups/</D:href>
            <D:propstat>
                <D:status>HTTP/1.1 200 OK</D:status>
                <D:prop>
                    <hm:inbox>http://localhost:9080/ups/INBOX/</hm:inbox>
    <hm:sendmsg>http://localhost:9080/ups/AOL_MAIL_SUBMISSION_URL/</hm:sendmsg>
                    <hm:sentitems>http://localhost:9080/ups/Sent Items/</hm:sentitems>
                    <hm:msgfolderroot>http://localhost:9080/ups/</hm:msgfolderroot>
                </D:prop>
            </D:propstat>
        </D:response>
    </D:multistatus>
```

Program Listing #2 - Exemplary Inbox Request

```
    Query Folder Capabilities:
    REQUEST:
    OPTIONS /ups/INBOX/ HTTP/1.1
    User-Agent: Mozilla/4.0 (compatible; MSIE 5.5; Windows NT 5.0)
    Connection: Keep-Alive
    Host: localhost:9080
    Cookie: JSESSIONID=C70CD1AED7D2BE210B34D93F7ACD6935
    Content-Length: 0
    RESPONSE:
    HTTP/1.1 200 OK
    allow: OPTIONS, PROPFIND, MOVE, DELETE, BDELETE, BMOVE, SEARCH
    dasl: <urn:schemas:corp:universalproxy:basicsearch>
    Content-Type: text/plain
    Content-Length: 0
    Date: Wed, 06 Aug 2003 18:20:28 GMT
    Server: Apache Coyote/1.0
    List messages in INBOX:
    REQUEST:
    PROPFIND/ups/INBOX/ HTTP/1.1
    Range: rows=0-24
    Depth: 1,noroot
```

-continued

Computer Program Listings

```
Brief: t
Pragma: no-cache
Content-Type: text/xml
X_UP_REFRESH_CACHE: force
User-Agent: Mozilla/4.0 (compatible; MSIE 5.5; Windows NT 5.0)
Connection: Keep-Alive
Host: localhost:9080
Cookie: JSESSIONID=C70CD1AED7D2BE210B34D93F7ACD6935
Content-Length: 586
<?xml version="1.0"?>
<D:propfind xmlns:D="DAV:" xmlns:hm="urn:schemas:httpmail:" xmlns:m="urn:schemas:mailheader:"
xmlns:up="urn:schemas:corp:universalproxy">
    <D:prop>
        <D:uid/>
        <D:isfolder/>
        <D:ishidden/>
        <hm:read/>
        <hm:hasattachment/>
        <hm:importance/>
        <m:from/>
        <m:subject/>
        <m:date/>
        <up:isdeleted/>
        <D:getcontentlength/>
        <D:contentclass/>
    </D:prop>
</D:propfind>
RESPONSE:
HTTP/1.1 207 Multi-Status
Content-Range: rows 0-8; total=9
Content-Type: text/xml
Transfer-Encoding: chunked
Date: Wed, 06 Aug 2003 18:20:28 GMT
Server: Apache Coyote/1.0
<?xml version="1.0" encoding="UTF-8"?>
<D:multistatus    xmlns:D="DAV:"    xmlns:up="urn:schemas:corp:universalproxy"
xmlns:c="urn:schemas:calendar:" xmlns:a="urn:schemas:contacts:" xmlns:hm="urn:schemas:httpmail:"
xmlns:m="urn:schemas:mailheader:">
    <D:contentrange>0-8</D:contentrange>
    <D:response>
        <D:href>http://localhost:9080/ups/INBOX/6623963;1</D:href>
        <D:propstat>
            <D:status>HTTP/1.1 200 OK</D:status>
            <D:prop>
                <D:uid>3ac59b38c08ad3356435efea144660e3</D:uid>
                <D:isfolder>0</D:isfolder>
                <D:ishidden>0</D:ishidden>
                <hm:read>0</hm:read>
                <hm:hasattachment>0</hm:hasattachment>
                <hm:importance>1</hm:importance>
                <m:from>Mail Delivery Subsystem <MAILER-DAEMON@aol.com></m:from>
                <m:subject>Returned mail: User unknown</m:subject>
                <m:date>2003-08-05T23:12:48Z</m:date>
                <up:isdeleted>0</up:isdeleted>
                <D:getcontentlength>3247</D:getcontentlength>
                <D:contentclass>urn:content-classes:message</D:contentclass>
            </D:prop>
        </D:propstat>
    </D:response>
    <D:response>
        <D:href>http://localhost:9080/ups/INBOX/6623954;1</D:href>
        <D:propstat>
            <D:status>HTTP/1.1 200 OK</D:status>
            <D:prop>
                <D:uid>51073b22a28c2820115bc80d42e8c6ec</D:uid>
                <D:isfolder>0</D:isfolder>
                <D:ishidden>0</D:ishidden>
                <hm:read>1</hm:read>
                <hm:hasattachment>0</hm:hasattachment>
                <hm:importance>1</hm:importance>
                <m:from>johnsmith@demo.com</m:from>
                <m:subject>Re: Test #1-All -French template</m:subject>
                <m:date>2003-08-05T23:10:30Z</m:date>
                <up:isdeleted>0</up:isdeleted>
                <D:getcontentlength>1577</D:getcontentlength>
                <D:contentclass>urn:content-classes:message</D:contentclass>
            </D:prop>
```

|                                                  |
| ------------------------------------------------ |
| -continued                                       |
| Computer Program Listings                        |

```
        </D:propstat>
    </D:response>
    <D:response>
        <D:href>http://localhost:9080/ups/INBOX/6623926;1</D:href>
        <D:propstat>
            <D:status>HTTP/1.1 200 OK</D:status>
            <D:prop>
                <D:uid>b072c3748ceff1320f9fa746f797e64b</D:uid>
                <D:isfolder>0</D:isfolder>
                <D:ishidden>0</D:ishidden>
                <hm:read>1</hm:read>
                <hm:hasattachment>0</hm:hasattachment>
                <hm:importance>1</hm:importance>
                <m:from>johnsmith@demo.com</m:from>
                <m:subject>Re: xxxFWD: Re: Test #1</m:subject>
                <m:date>2003-08-05T23:07:18Z</m:date>
                <up:isdeleted>0</up:isdeleted>
                <D:getcontentlength>1927</D:getcontentlength>
                <D:contentclass>urn:content-classes:message</D:contentclass>
            </D:prop>
        </D:propstat>
    </D:response>
    <D:response>
        <D:href>http://localhost:9080/ups/INBOX/6623922;1</D:href>
        <D:propstat>
            <D:status>HTTP/1.1 200 OK</D:status>
            <D:prop>
                <D:uid>11f1c8e69555d33971aea12c09be5021</D:uid>
                <D:isfolder>0</D:isfolder>
                <D:ishidden>0</D:ishidden>
                <hm:read>1</hm:read>
                <hm:hasattachment>0</hm:hasattachment>
                <hm:importance>1</hm:importance>
                <m:from>johnsmith@demo.com</m:from>
                <m:subject>Re: xxxFWD: Re: Test #1</m:subject>
                <m:date>2003-08-05T23:06:45Z</m:date>
                <up:isdeleted>0</up:isdeleted>
                <D:getcontentlength>1930</D:getcontentlength>
                <D:contentclass>urn:content-classes:message</D:contentclass>
            </D:prop>
        </D:propstat>
    </D:response>
    <D:response>
        <D:href>http://localhost:9080/ups/INBOX/6623915;1</D:href>
        <D:propstat>
            <D:status>HTTP/1.1 200 OK</D:status>
            <D:prop>
                <D:uid>55bc30adfb4fb66f3d11b0416c82b701</D:uid>
                <D:isfolder>0</D:isfolder>
                <D:ishidden>0</D:ishidden>
                <hm:read>1</hm:read>
                <hm:hasattachment>1</hm:hasattachment>
                <hm:importance>1</hm:importance>
                <m:from>johnsmith@demo.com</m:from>
                <m:subject>xxxFWD: Re: Test #1</m:subject>
                <m:date>2003-08-05T23:05:27Z</m:date>
                <up:isdeleted>0</up:isdeleted>
                <D:getcontentlength>3254</D:getcontentlength>
                <D:contentclass>urn:content-classes:message</D:contentclass>
            </D:prop>
        </D:propstat>
    </D:response>
    <D:response>
        <D:href>http://localhost:9080/ups/INBOX/6623910;1</D:href>
        <D:propstat>
            <D:status>HTTP/1.1 200 OK</D:status>
            <D:prop>
                <D:uid>07cdf24a06f8e849754f90fe6dc8bf4f</D:uid>
                <D:isfolder>0</D:isfolder>
                <D:ishidden>0</D:ishidden>
                <hm:read>1</hm:read>
                <hm:hasattachment>0</hm:hasattachment>
                <hm:importance>1</hm:importance>
                <m:from>johnsmith@demo.com</m:from>
                <m:subject>Re: Test #1-All</m:subject>
                <m:date>2003-08-05T23:04:31Z</m:date>
                <up:isdeleted>0</up:isdeleted>
```

-continued

Computer Program Listings

```
        <D:getcontentlength>1258</D:getcontentlength>
        <D:contentclass>urn:content-classes:message</D:contentclass>
      </D:prop>
    </D:propstat>
  </D:response>
  <D:response>
    <D:href>http://localhost:9080/ups/INBOX/6623909;1</D:href>
    <D:propstat>
      <D:status>HTTP/1.1 200 OK</D:status>
      <D:prop>
        <D:uid>0e79a3593253ffb9596bf9d86873f498</D:uid>
        <D:isfolder>0</D:isfolder>
        <D:ishidden>0</D:ishidden>
        <hm:read>1</hm:read>
        <hm:hasattachment>0</hm:hasattachment>
        <hm:importance>1</hm:importance>
        <m:from>johnsmith@demo.com</m:from>
        <m:subject>Re: Test #1</m:subject>
        <m:date>2003-08-05T23:04:13Z</m:date>
        <up:isdeleted>0</up:isdeleted>
        <D:getcontentlength>1241</D:getcontentlength>
        <D:contentclass>urn:content-classes:message</D:contentclass>
      </D:prop>
    </D:propstat>
  </D:response>
  <D:response>
    <D:href>http://localhost:9080/ups/INBOX/6605332;1</D:href>
    <D:propstat>
      <D:status>HTTP/1.1 200 OK</D:status>
      <D:prop>
        <D:uid>6060b944e60256c814498af29e5f0e47</D:uid>
        <D:isfolder>0</D:isfolder>
        <D:ishidden>0</D:ishidden>
        <hm:read>0</hm:read>
        <hm:hasattachment>0</hm:hasattachment>
        <hm:importance>1</hm:importance>
        <m:from>aolmbrsecurity@aol.com</m:from>
        <m:subject>Security Notice to AOL Members</m:subject>
        <m:date>2003-08-01T23:00:58Z</m:date>
        <up:isdeleted>0</up:isdeleted>
        <D:getcontentlength>5137</D:getcontentlength>
        <D:contentclass>urn:content-classes:message</D:contentclass>
      </D:prop>
    </D:propstat>
  </D:response>
  <D:response>
    <D:href>http://localhost:9080/ups/INBOX/6567082;1</D:href>
    <D:propstat>
      <D:status>HTTP/1.1 200 OK</D:status>
      <D:prop>
        <D:uid>f47b72c8c1aa91458f40f81fce3b5e05</D:uid>
        <D:isfolder>0</D:isfolder>
        <D:ishidden>0</D:ishidden>
        <hm:read>0</hm:read>
        <hm:hasattachment>0</hm:hasattachment>
        <hm:importance>1</hm:importance>
        <m:from>aolmemberinfo@aol.com</m:from>
        <m:subject>Coming Soon - AOL 9.0 Optimized</m:subject>
        <m:date>2003-07-25T21:15:22Z</m:date>
        <up:isdeleted>0</up:isdeleted>
        <D:getcontentlength>10012</D:getcontentlength>
          <D:contentclass>urn:content-classes:message</D:contentclass>
      </D:prop>
    </D:propstat>
  </D:response>
</D:multistatus>
```

Program Listing #3 - Exemplary Folder Search Request

```
Capabilities of folder:
REQUEST:
OPTIONS /ups HTTP/1.1
User-Agent: Mozilla/4.0 (compatible; MSIE 5.5; Windows NT 5.0)
Connection: Keep-Alive
Host: localhost:9080
Cookie: JSESSIONID=C70CD1AED7D2BE210B34D93F7ACD6935
Content-Length: 0
RESPONSE:
```

-continued

Computer Program Listings

```
HTTP/1.1 200 OK
allow: OPTIONS, PROPFIND, MOVE, DELETE, BDELETE, BMOVE, SEARCH
dasl: <urn:schemas:corp:universalproxy:basicsearch>
Content-Type: text/plain
Content-Length: 0
Date: Wed, 06 Aug 2003 18:20:28 GMT
Server: Apache Coyote/1.0
Search for folders:
REQUEST:
SEARCH /ups HTTP/1.1
Depth: 1,noroot
Brief: t
Pragma: no-cache
Content-Type: text/xml
User-Agent: Mozilla/4.0 (compatible; MSIE 5.5; Windows NT 5.0)
Connection: Keep-Alive
Host: localhost:9080
Cookie: JSESSIONID=C70CD1AED7D2BE210B34D93F7ACD6935
Content-Length: 922
<?xml version="1.0"?>
<D:searchrequest xmlns:D="DAV:" xmlns:t="urn:schemas:corp:universalproxy">
    <t:basicsearch>
       <D:select>
          <D:prop><D:uid/></D:prop>
          <D:prop><D:contentclass/></D:prop>
          <D:prop><D:displayname/></D:prop>
       </D:select>
       <D:from>
          <D:scope>
             <D:href>url</D:href>
             <D:depth>1</D:depth>
          </D:scope>
       </D:from>
       <D:where>
          <D:eq>
             <D:prop><D:contentclass/></D:prop>
             <D:literal>urn:content-classes:mailfolder</D:literal>
          </D:eq>
       </D:where>
    </t:basicsearch>
</D:searchrequest>
RESPONSE:
HTTP/1.1 207 Multi-Status
Content-Type: text/xml
Transfer-Encoding: chunked
Date: Wed, 06 Aug 2003 18:20:28 GMT
Server: Apache Coyote/1.0
<?xml version="1.0" encoding="UTF-8"?>
<D:multistatus    xmlns:D="DAV:"    xmlns:up="urn:schemas:corp:universalproxy"
xmlns:c="urn:schemas:calendar:" xmlns:a="urn:schemas:contacts:" xmlns:hm="urn:schemas:httpmail:"
xmlns:m="urn:schemas:mailheader:">
     <D:response>
        <D:href>http://localhost:9080/ups/INBOX/</D:href>
        <D:propstat>
           <D:status>HTTP/1.1 200 OK</D:status>
           <D:prop>
              <D:uid>c90d66b2362a1a0bc3df1852021a6f63</D:uid>
              <D:contentclass>urn:content-classes:mailfolder</D:contentclass>
              <D:displayname>INBOX/</D:displayname>
           </D:prop>
        </D:propstat>
     </D:response>
     <D:response>
        <D:href>http://localhost:9080/ups/VOICE-MAIL/</D:href>
        <D:propstat>
           <D:status>HTTP/1.1 200 OK</D:status>
           <D:prop>
              <D:uid>cabbce34709ab79d2ad2d5334d998272</D:uid>
              <D:contentclass>urn:content-classes:mailfolder</D:contentclass>
              <D:displayname>VOICE-MAIL/</D:displayname>
           </D:prop>
        </D:propstat>
     </D:response>
</D:multistatus>
```

-continued

Computer Program Listings

Program Listing #4 - Exemplary Configuration File

```
<resource
    contentclass="urn:content-classes:mailfolder"
    javaclass="com.teamon.proxy.data.impl.MailFolderImpl"
    responsecacheduration="0"
    cachestrength="0">
  <request method="PROPFIND">
    <header name="Brief"   value="t" />
    <header name="Content-Type" value="text/xml"/>
    <header name="Depth"   value="1,noroot"/>
    <header name="Range"   value="rows=$rangeStart$-$rangeEnd$"/>
    <header name="Pragma"   value="no-cache"/>
    <header name="X_UP_REFRESH_CACHE" value="force" />
    <body><![CDATA[
      <?xml version="1.0"?>
      <D:propfind
          xmlns:D="DAV:"
          xmlns:hm="urn:schemas:httpmail:"
          xmlns:m="urn:schemas:mailheader:"
          xmlns:up="urn:schemas:teamon:universalproxy">
        <D:prop>
          <D:uid/>
          <D:isfolder/>
          <D:ishidden/>
          <hm:read/>
          <hm:hasattachment/>
          <hm:importance/>
          <m:from/>
          <m:subject/>
          <m:date/>
          <up:isdeleted/>
          <D:getcontentlength/>
          <D:contentclass/>
        </D:prop>
      </D:propfind>
    ]]>
    </body>
  </request>
</resource>
```

That which is claimed is:

1. A communications system comprising:
a plurality of data storage devices each using at least one of a plurality of different operating protocols;
a plurality of mobile wireless communications devices for accessing said plurality of data storage devices and each using at least one of the plurality of different operating protocols; and
a protocol interface device comprising
    a protocol engine module for communicating with said plurality of data storage devices using respective operating protocols,
    a front-end proxy module coupled to said protocol engine module and comprising
        a respective proxy module for communicating with said plurality of mobile wireless communications devices using each different operating protocol, and
        at least one common core service module coupled to said proxy module for routing traffic between said proxy module and said protocol engine module,
    a configuration file module coupled to said front-end proxy module for storing a plurality of different sets of configuration files relating to different allocations of resources of the at least one common core service module,
said at least one common core service module allocating resources based upon a given service to be performed and a corresponding set of configuration files stored in said configuration file module,
said at least one common core service module comprising a plurality of handlers for interfacing said proxy module with said protocol engine module
said proxy module converting access requests from said plurality of mobile wireless communications devices to common access parameters,
said front-end proxy module further comprising a flow controller module for receiving the common access parameters from the proxy module and selecting desired handlers for processing thereof.

2. The communications system of claim 1 wherein said plurality of different sets of configuration files comprises a primary set of configuration files corresponding to core resource allocation operations, and a secondary set of configuration files for customizing the core resource allocation operations.

3. The communications system of claim 1 wherein said at least one common core service module is for accessing data from said plurality of data storage devices.

4. The communications system of claim 1 wherein said at least one common core service module is for rendering data for said plurality of mobile wireless communications devices.

5. The communications system of claim 1 wherein said plurality of handlers and said protocol engine module communicate using a common interface protocol.

6. The communications system of claim 1 further comprising a renderer module for cooperating with said proxy modules to format data for said plurality of mobile wireless communications devices.

7. The communications system of claim 6 further comprising an extensible markup language (XML) engine module coupled to said renderer module.

8. The communications system of claim 7 further comprising a memory coupled to said XML engine module for storing a plurality of templates corresponding to respective operating protocols.

9. A protocol interface device for interfacing a plurality of mobile wireless communications devices with a plurality of data storage devices, the mobile wireless communications devices and the data storage devices each using at least one of a plurality of different operating protocols, the protocol interface device comprising:
a protocol engine module for communicating with the plurality of data storage devices using respective operating protocols;
a front-end proxy module coupled to said protocol engine and comprising
a respective proxy module for communicating with the plurality of mobile wireless communications devices using each different operating protocol, and
at least one common core service module coupled to said proxy module for routing traffic between said proxy module and said protocol engine module; and
a configuration file module coupled to said front-end proxy module for storing a plurality of different sets of configuration files relating to different allocations of resources of the at least one common core service module;
said at least one common core service module allocating resources based upon a given service to be performed and a corresponding set of configuration files stored in said configuration file module;
said at least one common core service module comprising a plurality of handlers for interfacing said proxy module with said protocol engine module
said proxy module converting access requests from said plurality of mobile wireless communications devices to common access parameters;
said front-end proxy module further comprising a flow controller module for receiving the common access parameters from the proxy module and selecting desired handlers for processing thereof.

10. The protocol interface device of claim 9 wherein said plurality of different sets of configuration files comprises a primary set of configuration files corresponding to core resource allocation operations, and a secondary set of configuration files for customizing the core resource allocation operations.

11. The protocol interface device of claim 9 wherein said at least one common core service module is also for at least one of accessing data from the plurality of data storage devices and rendering data for the plurality of mobile wireless communications devices.

12. A protocol interface device for interfacing a plurality of communications devices with a plurality of data storage devices, the communications devices and the data storage devices each using at least one of a plurality of different operating protocols, the protocol interface device comprising:
a protocol engine module for communicating with the plurality of data storage devices using respective operating protocols;
a front-end proxy module coupled to said protocol engine and comprising
a respective proxy module for communicating with the plurality of communications devices using each different operating protocol, and
at least one common core service module coupled to said proxy module for routing traffic between said proxy module and said protocol engine module; and
a configuration file module coupled to said front-end proxy module for storing a plurality of different sets of configuration files relating to different allocations of resources of the at least one common core service module;
said at least one common core service module allocating resources based upon a given service to be performed and a corresponding set of configuration files stored in said configuration file module;
said at least one common core service module com rising a plurality of handlers for interfacing said proxy module with said protocol engine module;
said proxy module converting access requests from said plurality of mobile wireless communications devices to common access parameters:
said front-end proxy module further comprising a flow controller module for receiving the common access parameters from the proxy module and selecting desired handlers for processing thereof.

13. The protocol interface device of claim 12 wherein said plurality of different sets of configuration files comprises a primary set of configuration files corresponding to core resource allocation operations, and a secondary set of configuration files for customizing the core resource allocation operations.

14. The protocol interface device of claim 12 wherein said at least one common core service module is also for at least one of accessing data from the plurality of data storage devices and rendering data for the plurality of communications devices.

15. A method for interfacing a plurality of mobile wireless communications devices with a plurality of data storage devices, the mobile wireless communications devices and the data storage devices each using at least one of a plurality of different operating protocols, the method comprising:
providing a protocol engine module for communicating with the plurality of data storage devices using respective operating protocols;
coupling a front-end proxy module to the protocol engine comprising
a respective proxy module for communicating with the plurality of mobile wireless communications devices using each different operating protocol, and
at least one common core service module coupled to the proxy module for routing traffic between the proxy module and the protocol engine module; and
providing a configuration file module for the front-end proxy module for storing a plurality of different sets of configuration files relating to different allocations of resources of the at least one common core service module,
the at least one common core service module allocating resources based upon a given service to be performed and a corresponding set of configuration files stored in the configuration file module;
the at least one common core service module com rising a plurality of handlers for interfacing the proxy module with the protocol engine module;

the proxy module converting access requests from the plurality of mobile wireless communications devices to common access parameters;

the front-end proxy module further comprising a flow controller module for receiving the common access parameters from the proxy module and selecting desired handlers for processing thereof.

16. The method of claim 15 wherein the plurality of different sets of configuration files comprises a primary set of configuration files corresponding to core resource allocation operations, and a secondary set of configuration files for customizing the core resource allocation operations.

17. The method of claim 15 wherein the at least one common core service module is also for at least one of accessing data from the plurality of data storage devices and rendering data for the plurality of mobile wireless communications devices.

18. A computer-readable medium having computer executable modules for interfacing a plurality of mobile wireless communications devices with a plurality of data storage devices, the mobile wireless communications devices and the data storage devices each using at least one of a plurality of different operating protocols, the computer-readable medium comprising:

a protocol engine module for communicating with the plurality of data storage devices using respective operating protocols;

a front-end proxy module coupled to the protocol engine and comprising
a respective proxy module for communicating with the plurality of mobile wireless communications devices using each different operating protocol, and
at least one common core service module coupled to the proxy modules for routing traffic between the proxy modules and the protocol engine module; and a configuration file module coupled to the front-end proxy module for storing a plurality of different sets of configuration files relating to different allocations of resources of the at least one common core service module;

the at least one common core service module allocating resources based upon a given service to be performed and a corresponding set of configuration files stored in the configuration file module;

the at least one common core service module comprising a plurality of handlers for interfacing the proxy module with the protocol engine module;

the proxy module converting access requests from the plurality of mobile wireless communications devices to common access parameters;

the front-end proxy module further com rising a flow controller module for receiving the common access parameters from the proxy module and selecting desired handlers for processing thereof.

19. The computer-readable medium of claim 18 wherein the plurality of different sets of configuration files comprises a primary set of configuration files corresponding to core resource allocation operations, and a secondary set of configuration files for customizing the core resource allocation operations.

20. The computer-readable medium of claim 18 wherein the at least one common core service module is also for at least one of accessing data from the plurality of data storage devices and rendering data for the plurality of mobile wireless communications devices.

* * * * *

UNITED STATES PATENT AND TRADEMARK OFFICE
CERTIFICATE OF CORRECTION

PATENT NO. : 7,685,302 B2  Page 1 of 1
APPLICATION NO. : 10/777936
DATED : March 23, 2010
INVENTOR(S) : Clarke et al.

It is certified that error appears in the above-identified patent and that said Letters Patent is hereby corrected as shown below:

| | |
|---|---|
| On the Title Page Item (56) Page 2 "FOREIGN PATENT DOCUMENTS" | Insert: --WO  0207468  1/2002-- |
| Item (56) Page 2 "OTHER ART" | Insert: --IzyMail Online, IzySoft 2003. How IzyMail Works, IzySoft 2003. IzyMail Server, IzySoft 2003. David Mery, "Why is a Different Operating System Needed?", Technology Outreach, Symbian Ltd., October 2003, Revision 2.4, pgs. 1-5 Erik Dasque, "What is WebDAV?", Novell, May 24, 2001, 2 pages-- |
| Column 35, Line 6 | Delete: "markup" Insert: --mark-up-- |
| Column 36, Line 18 | Delete: "com rising" Insert: --comprising-- |
| Column 36, Line 65 | Delete: "corn rising" Insert: --comprising-- |
| Column 38, Line 19 | Delete: "com rising" Insert: --comprising-- |

Signed and Sealed this

Twenty-fourth Day of August, 2010

David J. Kappos
*Director of the United States Patent and Trademark Office*